(12) United States Patent
Hatakenaka

(10) Patent No.: US 11,782,433 B2
(45) Date of Patent: Oct. 10, 2023

(54) LEARNED MODEL GENERATION METHOD

(71) Applicant: Panasonic Intellectual Property Management Co., Ltd., Osaka (JP)

(72) Inventor: Shinya Hatakenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 17/506,295

(22) Filed: Oct. 20, 2021

(65) Prior Publication Data

US 2022/0035362 A1 Feb. 3, 2022

Related U.S. Application Data

(63) Continuation of application No. PCT/JP2020/004605, filed on Feb. 6, 2020.

(30) Foreign Application Priority Data

Apr. 22, 2019 (JP) ................... 2019-081115

(51) Int. Cl.
*G05B 23/02* (2006.01)
*G06N 20/00* (2019.01)
*G05B 19/418* (2006.01)

(52) U.S. Cl.
CPC ..... *G05B 23/0283* (2013.01); *G05B 19/4183* (2013.01); *G06N 20/00* (2019.01)

(58) Field of Classification Search
CPC ..... G05B 23/0283; G06N 20/00; Y02P 70/50; H01M 10/04; H01M 10/058
See application file for complete search history.

(56) References Cited

U.S. PATENT DOCUMENTS

| 6,327,774 | B1* | 12/2001 | Cheon ................... | H01M 4/04 29/730 |
| 2015/0325833 | A1* | 11/2015 | Harayama .......... | H01M 50/645 429/185 |
| 2018/0136616 | A1* | 5/2018 | Takami ................. | G06Q 10/20 |
| 2019/0171194 | A1* | 6/2019 | Sato ................... | G05B 23/0294 |

FOREIGN PATENT DOCUMENTS

| CN | 104185771 B | * 11/2015 | ............ B65H 81/00 |
| JP | 2017-167708 | 9/2017 | |

* cited by examiner

*Primary Examiner* — Manuel A Rivera Vargas
(74) *Attorney, Agent, or Firm* — Wenderoth, Lind & Ponack, L.L.P.

(57) ABSTRACT

A learned model generation method involves: outputting, when it is determined that the sequence of the positions of a first end surface of a first sheet material indicated by first data intersects with the sequence of the positions of a second end surface of a second sheet material indicated by second data, information indicating that a roll is defective and that the defect is caused by a first feed reel or a first affixing roller; and generating a facility state diagnosis model by using the first data and the second data read before preservation of the first feed reel when it is determined that a first difference between a first defect rate of the roll before the preservation of the first feed reel and a second defect rate of the roll after the preservation of the first feed reel is equal to or larger than a prescribed value.

12 Claims, 26 Drawing Sheets

PD

| PRODUCTION DATE/TIME | FACILITY | INSPECTION RESULT | FIRST SHEET MEMBER | SECOND SHEET MEMBER | SHAPE DATA ID |
|---|---|---|---|---|---|
| 2018/2/15 12:00:00 | A | FAIR | C001-01 | A001-01 | 0001 |
| 2018/2/15 12:01:00 | B | POOR | C001-02 | A001-02 | 0002 |
| 2018/2/15 12:02:30 | C | GOOD | C001-03 | A001-03 | 0003 |
| ... | ... | ... | ... | ... | ... |

MD

| MAINTENANCE DATE/TIME | FACILITY | DETAILS OF MAINTENANCE OPERATION |
|---|---|---|
| 2018/2/15 12:00:00 | A | BONDING ROLL PARALLELISM ADJUSTMENT |
| 2018/2/15 12:01:00 | B | FIRST SUPPLY REEL ADJUSTMENT |
| 2018/2/20 12:00:00 | C | BONDING ROLL CLEANING |
| ... | ... | ... |

| | MAINTENANCE PLAN ID | FACILITY | MAINTENANCE PLAN | AGGREGATE VALUE |
|---|---|---|---|---|
| MAINTENANCE GROUP 1 | 0001 | A | BONDING ROLL PARALLELISM ADJUSTMENT | 0.9 |
| MAINTENANCE GROUP 2 | 0002 | A | FIRST SUPPLY REEL ADJUSTMENT | 0.7 |
| MAINTENANCE GROUP 3 | 0003 | A | BONDING ROLL CLEANING | 0.6 |
| ... | ... | ... | ... | ... |

FIG. 16

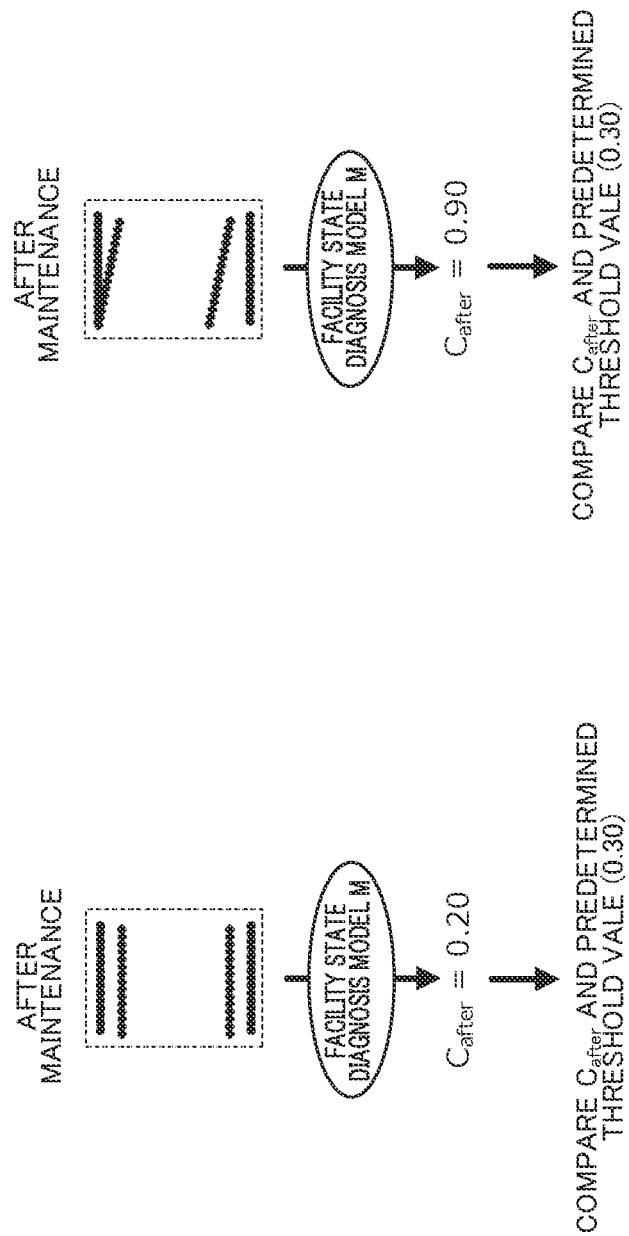

LEARNED MODEL GENERATION METHOD

TECHNICAL FIELD

The present disclosure relates to a method of generating a learned model to be used to display information about maintenance of production facilities.

BACKGROUND ART

It is common practice to set up a maintenance system for a certain facility in order to prevent deterioration or failure and to maintain normal operation. PTL 1 discloses a maintenance system that monitors the occurrence of abnormalities in substations, such as drainage pump failures and switchboard ground faults, and in the event of an abnormality, makes a notification to the facility personnel, and stores information on the maintenance and preservation work performed by the facility personnel in response to the abnormality.

CITATION LIST

Patent Literature

PTL 1
Japanese Patent Application Laid-Open No. 2017-167708

SUMMARY OF INVENTION

Technical Problem

In the technology disclosed in PTL 1, the facility personnel are notified only after an abnormality has occurred in the facility. Therefore, maintenance is performed by the facility personnel after the occurrence of the abnormality. When maintenance is performed after the occurrence of an abnormality, it is necessary to stop the operation of the facility. Therefore, it is desirable to make a notification when it is determined that maintenance is necessary before the occurrence of an abnormality. For this reason, it is desired to detect the signs of abnormalities that occur in the facility.

An object of the present disclosure is to provide a method of generating a learned model for detecting the signs of abnormalities.

Solution to Problem

A method of generating a learned model according to an embodiment of the present disclosure is a method of generating a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the method including: acquiring, from the sensor, first data representing a position of the first end surface read along the radial direction and second data representing a position of the second end surface read along the radial direction; outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and generating the learned model such that on a basis of the first data and the second data before and after maintenance of the first supply reel, when it is determined that a first difference between a first defect rate of the roll member before the maintenance of the first supply reel and a second defect rate of the roll member after the maintenance of the first supply reel is smaller than a predetermined value, the first data and the second data read before the maintenance of the first supply reel are not used for the generating of the learned model, whereas when it is determined that the first difference is equal to or greater than the predetermined value, the first data and the second data read before the maintenance of the first supply reel are used for the generating of the learned model.

A method of generating a learned model according to an embodiment of the present disclosure is a method of generating a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the method including: acquiring, from the sensor, first data representing a position of the first end surface read along the radial direction and second data representing a position of the second end surface read along the radial direction; outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and generating the learned model such that on a basis of the first data and the second data before and after maintenance of the first supply reel, when it is determined that a fifth defect rate of the roll member after the maintenance of the first supply reel is determined to be equal to or greater than a predetermined value, the first data and the second data read before the maintenance of the first supply reel are not used for the generating of the learned model, whereas when it is determined that the fifth defect rate is smaller than the predetermined value, the first data and the second data read before the maintenance of the first supply reel are used for the generating of the learned model.

A method of generating a learned model according to an embodiment of the present disclosure is a method of generating a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the method including: acquiring, from the sensor, first data representing a position of the first end surface read along the radial direction and second data representing a position of the second end surface read along the radial direction; generating a learned model for determining that a cause of a defect of the roll member is the first supply reel or the first bonding roller when it is determined that a sequence of the position of the first end surface represented by the first data intersects a sequence of the position of the second end surface represented by the second data on a basis of the first data and the second data; outputting information indicating that the cause of the defect is the first supply reel or the first bonding roller to a display apparatus for maintenance on a basis of a determination using the learned model; and updating the learned model such that when it is determined that a first difference between a first probability that the defect of the roll member is improved and a second probability that the defect of the roll member is improved is smaller than a predetermined value, the first data and the second data read before the maintenance of the first supply reel are not used for the updating of the learned model, whereas when it is determined that the first difference is equal to or greater than the predetermined value, the first data and the second data before the maintenance of the first supply reel are used for the updating of the learned model, the first probability being obtained by inputting the first data and the second data before the maintenance of the first supply reel to the learned model, the second probability being obtained by inputting by the first data and the second data after the maintenance of the first supply reel to the learned model.

Advantageous Effects of Invention

According to the present disclosure, the signs of abnormalities can be detected in facilities.

BRIEF DESCRIPTION OF DRAWINGS

FIG. 8 is a diagram illustrating an example of maintenance history data;

FIG. 16 is a diagram illustrating a specific example of a maintenance plan list;

FIG. 26A is a diagram for describing a modification of the method of determining whether the maintenance operation has an effect at a maintenance effect determination section in an update process; and FIG. 26B is a diagram for describing a modification of the method of determining whether the maintenance operation has an effect at a maintenance effect determination section in an update process.

DESCRIPTION OF EMBODIMENTS

Each embodiment of the present disclosure is elaborated below with reference to the accompanying drawings. Descriptions that are more detailed than necessary, such as detailed descriptions of matters already well known or duplicate descriptions of substantially identical configurations, may be omitted.

Note that the following description and referenced drawings are provided to assist those skilled in the art in understanding the present disclosure and are not intended to limit the scope of the claims of the present disclosure.

Embodiment 1

Maintenance Display Apparatus 100 and Production Apparatus 200

Figure 1:
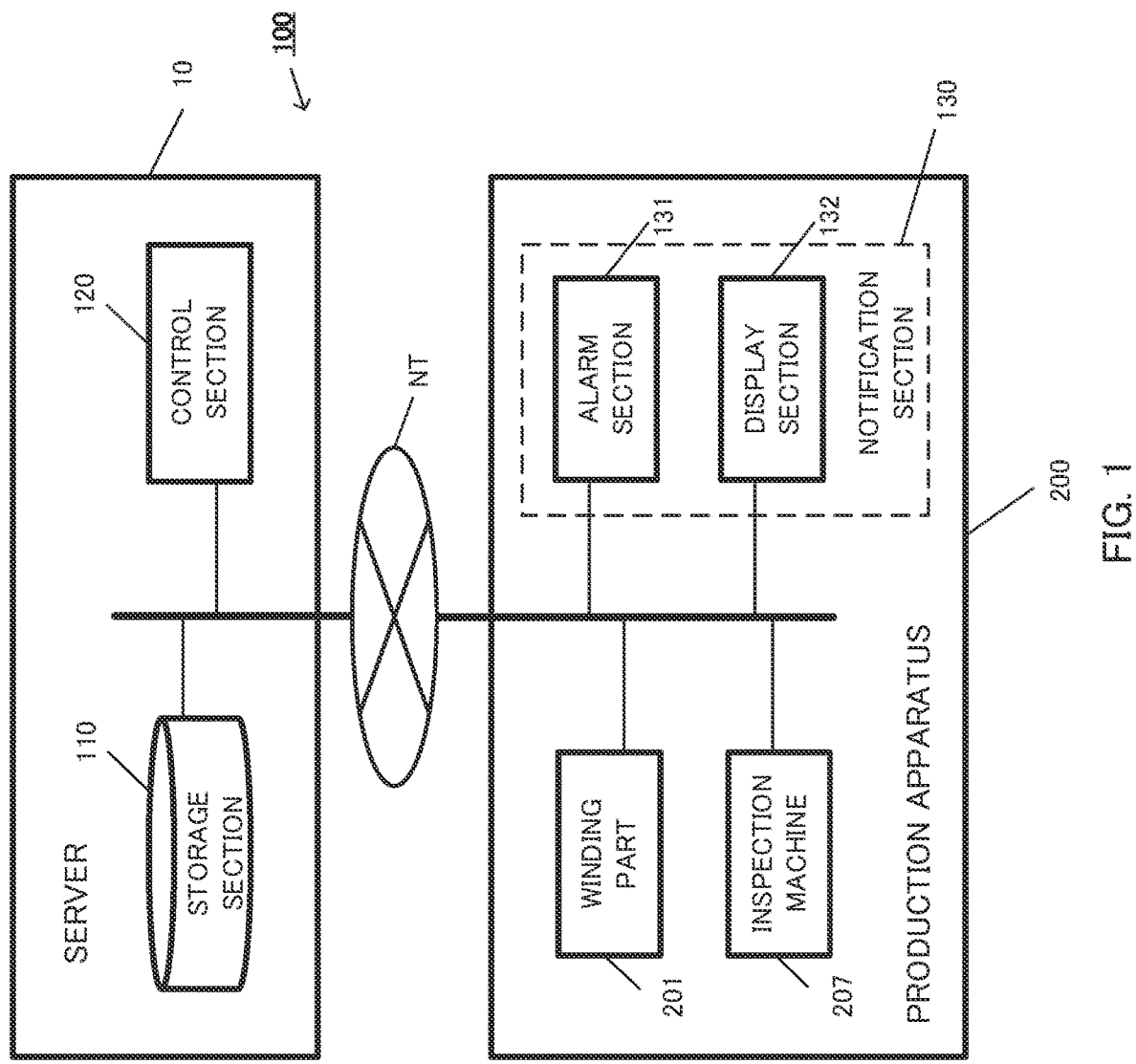
FIG. 1 is a network diagram including a maintenance display apparatus and a production apparatus to which the maintenance display apparatus is applied.

FIG. 1 is a network diagram including maintenance display apparatus 100 and production apparatus 200 to which maintenance display apparatus 100 is applied in Embodiment 1 of the present invention. Maintenance display apparatus 100 described in the present embodiment is an apparatus that performs a maintenance display of production apparatus 200 for producing a lithium ion secondary battery. While maintenance display apparatus 100 is applied to one production apparatus 200 in the example illustrated in FIG. 1, the present invention is not limited to this, and one maintenance display apparatus may be applied to a plurality of production apparatuses. In addition, while maintenance display apparatus 100 is described as an apparatus in the present embodiment, the present invention is not limited to this, and it may be a maintenance display system in which each component is connected through a network.

Maintenance display apparatus 100 includes server 10 including storage section 110 and control section 120, and notification section 130. Server 10 is communicatively connected to production apparatus 200 through network NT. Network NT is a public network such as the Internet, for example, or a local network such as an intra-enterprise local area network (LAN), for example.

Server 10 is, for example, a general-purpose computer, and includes storage section 110 and control section 120 as illustrated in FIG. 1.

Storage section 110 includes a main storage device (not illustrated) such as a read only memory (ROM) and a random access memory (RAM), for example, and/or an auxiliary storage device (not illustrated) such as a hard disk drive (HDD), a solid state drive (SSD) and a flash memory, for example.

Control section 120 is, for example, a hardware processor (not illustrated) such as a central processing unit (CPU), and controls the entire maintenance display apparatus 100 by loading and executing a program stored in storage section 110.

Storage section 110 and control section 120 may not be configured as an integrated computer. That is, storage section 110 and control section 120 may be configured as separate members disposed at respective positions separated from each other as long as they are communicable with each other. In addition, maintenance display apparatus 100 may include an operation section not illustrated in FIG. 1 and receive operation input from outside. Storage section 110 and control section 120 are elaborated later.

In the example illustrated in FIG. 1, notification section 130 is included in production apparatus 200, and is connected to server 10 through network NT. Notification section 130 makes a notification to the user of maintenance display apparatus 100 under the control of control section 120. Note that in the present embodiment, the user of maintenance display apparatus 100 includes the administrator of maintenance display apparatus 100, an operator who performs production of a roll member using maintenance display apparatus 100 (see FIG. 3B described later) and the like.

As illustrated in FIG. 1, notification section 130 includes alarm section 131 and display section 132. Alarm section 131 is, for example, a configuration that provides an alarm to the user using sound and/or light, such as a buzzer and a lamp. Display section 132 is, for example, a display device such as a liquid crystal display and an organic EL display, and is configured to display the details of the alert. Note that in addition to alarm section 131 and display section 132, notification section 130 may include, for example, a transmission section that transmits a mail including the details of the alert to the user's mail address registered in advance, and the like.

In the present embodiment, production apparatus 200 is a production apparatus of a lithium ion secondary battery. As illustrated in FIG. 1, production apparatus 200 includes winding part 201 and inspection machine 207. As elaborated later, winding part 201 produces a roll member by winding a positive electrode sheet and a negative electrode sheet. Inspection machine 207 makes an inspection of a roll member produced by winding part 201.

Note that while notification section 130 is included in production apparatus 200 in the example illustrated in FIG. 1, the present invention is not limited to this, and notification section 130 may be installed outside production apparatus 200. In addition, while notification section 130 is connected to server 10 through network NT in the example illustrated in FIG. 1, the present invention is not limited to this, and server 10 and notification section 130 may be directly connected without using network NT.

In addition, while a case where production apparatus 200 is a production apparatus of a lithium ion secondary battery is described in the present embodiment, the present invention is not limited to this. The maintenance display apparatus of the embodiment of the present invention may be applied to production facilities other than a production apparatus of a lithium ion secondary battery. Further, the maintenance display apparatus of the embodiment of the present invention may be applied to various facilities other than production facilities.

Figure 2:
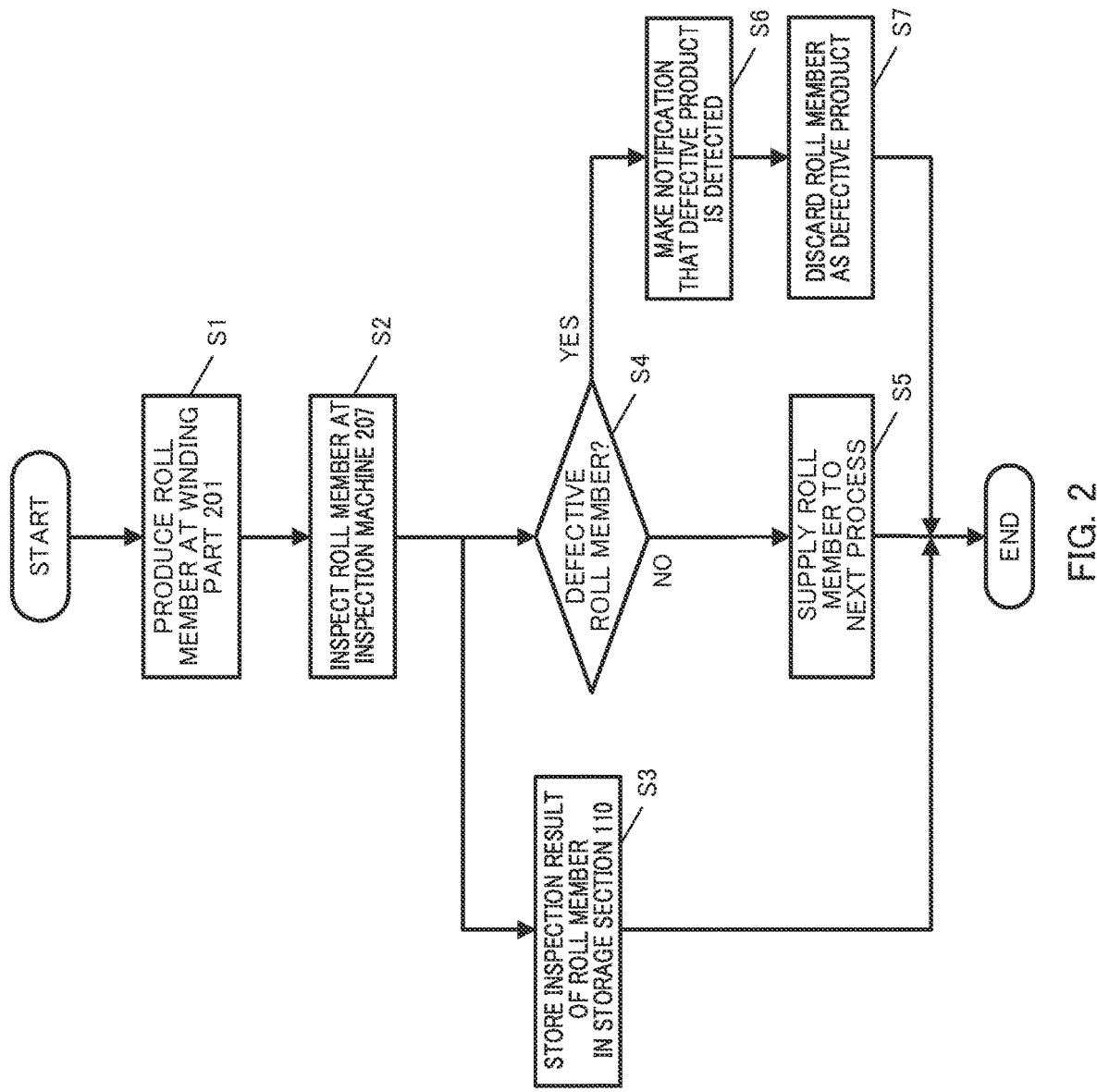
FIG. 2 is a flowchart of entire process steps of the maintenance display apparatus.

FIG. 2 is a flowchart of entire process steps of maintenance display apparatus 100.

At step S1, control section 120 causes winding part 201 of production apparatus 200 to produce a roll member.

At step S2, control section 120 causes inspection machine 207 to perform inspection of the produced roll member. The inspection of the roll member at inspection machine 207 is elaborated later.

At step S3, control section 120 causes storage section 110 to store the inspection result of inspection machine 207. Then, at step S4, control section 120 determines whether the roll member is a defective product on the basis of the inspection of inspection machine 207. Control section 120 proceeds the process to step S5 when it is determined that it is not a defective product (step S4: No), and control section 120 proceeds the process to step S6 when it is determined that it is a defective product (step S4: YES).

When it is determined that it is not a defective product, control section 120 causes production apparatus 200 to supply the roll member to the next step at step S5.

When it is determined that it is a defective product, control section 120 uses notification section 130 to make a notification that a defective product is detected at step S6. The notification of notification section 130 is elaborated later.

At step S7, control section 120 causes production apparatus 200 to discard the roll member determined to be a defective product.

Note that while control section 120 causes production apparatus 200 to supply the roll member to the next step or discard the roll member at step S5 and step S7 in the flowchart illustrated in FIG. 2, the present invention is not limited to this. For example, it is possible to cause the user of maintenance display apparatus 100 to supply or discard the roll member by providing a notification for urging the user to supply or discard the roll member, through notification section 130.

Next, production apparatus 200 is elaborated.

Winding Part 201

Figure 3A:
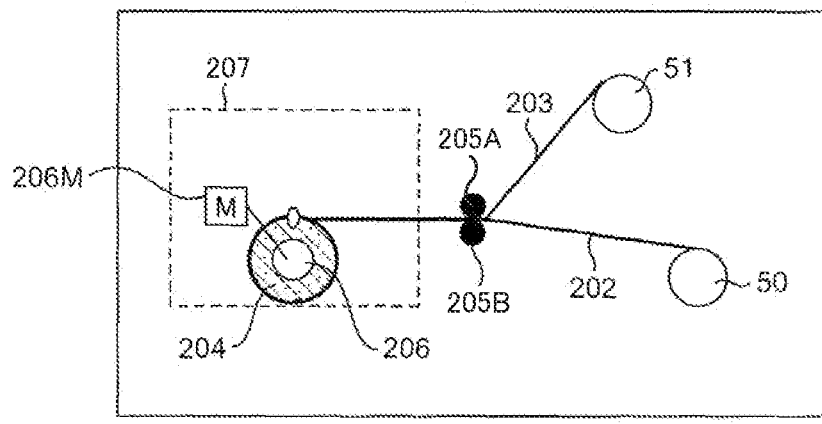
FIG. 3A is a diagram illustrating an example of a configuration of a winding part that produces a roll member in a production apparatus.

FIG. 3A is a diagram illustrating an example of a configuration of winding part 201 that produces a roll member in production apparatus 200.

As illustrated in FIG. 3A, winding part 201 includes first supply reel 50, second supply reel 51, first sheet member 202, second sheet member 203, first bonding roll 205A, second bonding roll 205B, winding core 206, winding core rotation drive part 206M, and inspection machine 207. Winding part 201 is a device that produces roll member 204 by bonding first sheet member 202 supplied from first supply reel 50 and second sheet member 203 supplied from second supply reel 51 using first bonding roll 205A and second bonding roll 205B, and winding it around winding core 206. Winding core rotation drive part 206M drives winding core 206 at a desired rotational speed.

Figure 3B:
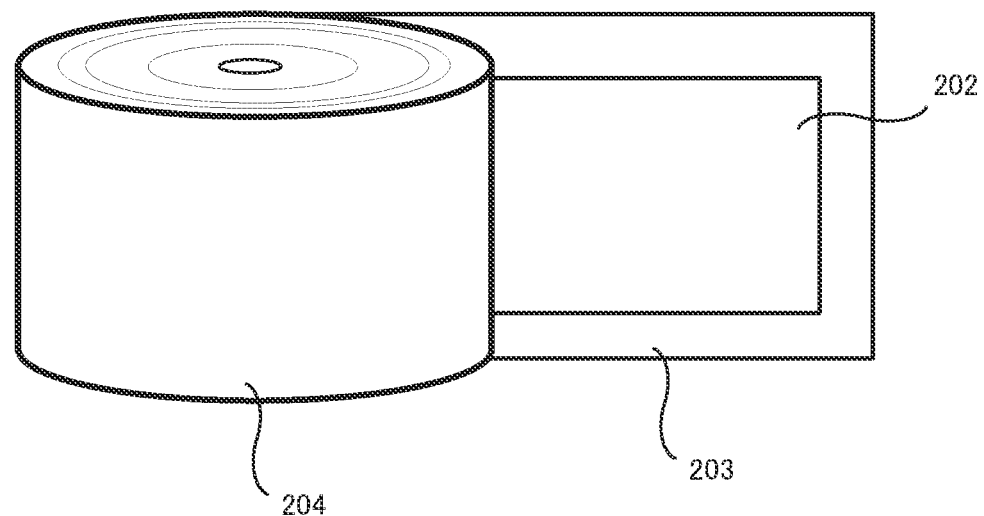
FIG. 3B is a perspective view illustrating an example of a roll member produced in the winding part.

FIG. 3B is a perspective view illustrating an example of roll member 204 produced at winding part 201. In FIG. 3B, end portions of first sheet member 202 and second sheet member 203 that make up roll member 204 are not wound. As illustrated in FIG. 3B, second sheet member 203 has a larger width (the length along the axis direction of roll member 204) than that of first sheet member 202. First sheet member 202 is, for example, a sheet-like member on which a positive electrode material is applied (positive electrode sheet), and second sheet member 203 is, for example, a sheet-like member on which a negative electrode material is applied (negative electrode sheet). First sheet member 202 is an example of the first electrode sheet of the present invention, and second sheet member 203 is an example of the second electrode sheet of the present invention. Note that while first sheet member 202 and second sheet member 203 are a positive electrode sheet member and a negative electrode sheet member, respectively in the above-described example, the present invention is not limited to this, and first sheet member 202 and second sheet member 203 may be a negative electrode sheet member and a positive electrode sheet member, respectively.

Inspection Machine 207

Inspection machine 207 makes an inspection of produced roll member 204. Inspection machine 207 is, for example, a swept source-optical coherence tomography (SS-OCT) device. Inspection machine 207 is an example of the sensor of the present invention.

Figure 4C:
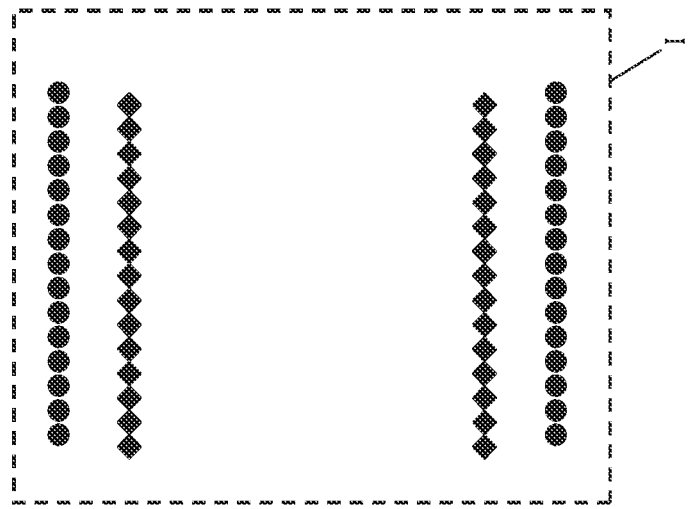
FIG. 4C is a diagram illustrating an example of an image generated through scanning of a cross section of the roll member illustrated in FIG. 4B at the inspection machine.
Figure 4B:
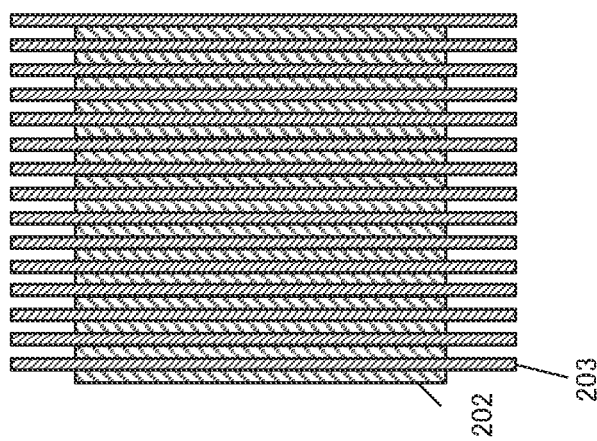
FIG. 4B is a schematic view illustrating an example of a cross-sectional shape along the radial direction of a roll member.
Figure 4A:
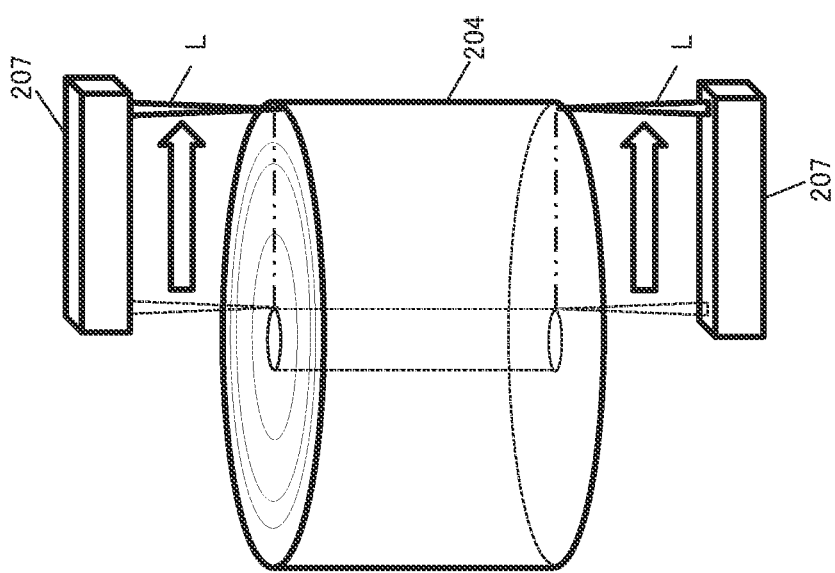
FIG. 4A is a schematic view illustrating an example of a state where an inspection machine inspects a roll member.

FIG. 4A is a schematic view illustrating an example of a state where inspection machine 207 inspects roll member 204. As illustrated in FIG. 4A, inspection machine 207 performs scanning with light L applied to roll member 204 being inspected by moving the light from the inside to the outside in the radial direction of roll member 204, and generates an image representing the internal structure shape of roll member 204 by utilizing the interference of light L.

FIG. 4B is a schematic view illustrating an example of a cross-sectional shape along the radial direction of roll member 204. In addition, FIG. 4C is a diagram illustrating an example of image I that is generated through scanning of the cross section of roll member 204 illustrated in FIG. 4B by using inspection machine 207. In FIG. 4B and FIG. 4C, the vertical direction corresponds to the axis direction of roll member 204, and the horizontal direction corresponds to the radial direction of roll member 204.

As illustrated in FIG. 4B, in the cross section along the radial direction of roll member 204, first sheet member 202 and second sheet member 203 with a width larger than that of first sheet member 202 are alternately stacked. Inspection machine 207 extracts and visualizes the positions of both end portions of first sheet member 202 along the axis direction and both end portions second sheet member 203 along the axis direction, in the radial direction of the roll member. In the example illustrated in FIG. 4C (image I), the rhombus (♦) corresponds to the first data representing the positions of both end portions of first sheet member 202, and the black circle (●) corresponds to the second data representing the positions of both end portions of second sheet member 203.

A defective product may be produced when roll member 204 is produced at winding part 201. A defective product can be generated due to defects of each component of the above-described winding part 201, especially first supply reel 50 and first bonding roll 205A. Inspection machine 207 generates an image representing the cross-sectional shape of roll member 204 along the radial direction as described above, and stores it as shape data in storage section 110. Results of the determination whether roll member 204 is defective based on the shape data are also stored in storage section 110. Note that the determination whether the product is a defective product based on the shape data may be performed by control section 120 in FIG. 1, or by inspection machine 207, or, by other configurations not illustrated in FIG. 1 or FIG. 3A. In the following, a case where control section 120 performs the determination of whether the product is a defective product based on the shape data is described.

Figure 5:
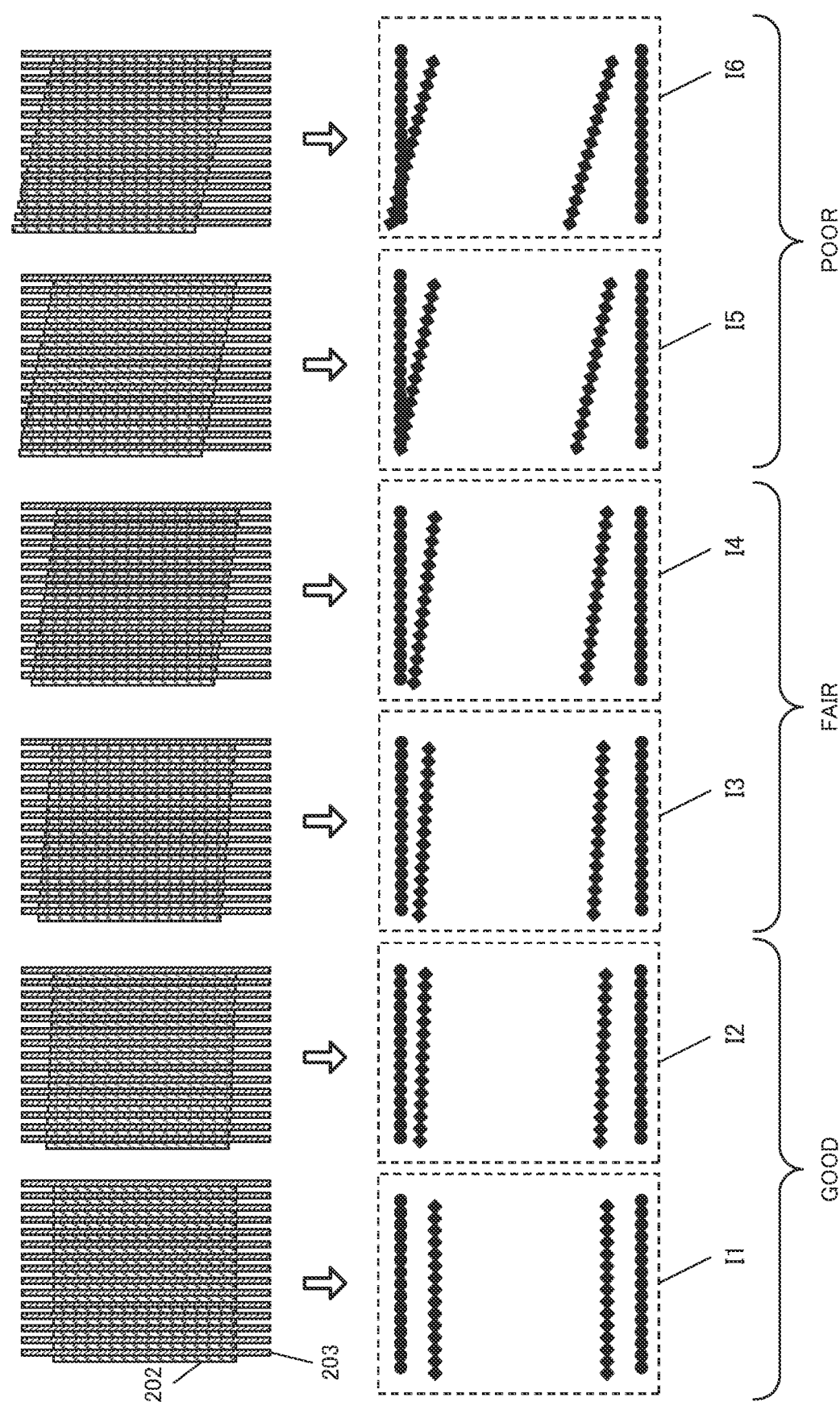
FIG. 5 is a schematic view illustrating a correspondence between a cross-sectional shape of a roll member and shape data.

FIG. 5 is a schematic view illustrating a correspondence between the cross-sectional shape of roll member 204 and the shape data. The upper section of FIG. 5 illustrates exemplary sectional views of roll member 204 of various states. In the example illustrated in FIG. 5, the misalignment between first sheet member 202 and second sheet member 203 decreases toward the left side, and the misalignment of first sheet member 202 increases toward the right side.

The lower section of FIG. 5 illustrates examples of images I1 to I6, which are generated based on the cross-sectional shapes of roll member 204 exemplified in the upper section of FIG. 5. When the misalignment of first sheet member 202 increases, the sequence of the positions of the upper end surface (the first end surface of the present invention) of first sheet member 202 represented by the first data may intersect the sequence of the positions of the upper end surface (the second end surface of the present invention) represented by the second data of second sheet member 203. In other words, a first virtual line that connects a plurality of positions of the upper end surface (the first end surface of the present invention) of first sheet member 202 represented by the first data may intersect a second virtual line that connects a plurality of positions of the upper end surface (the second end surface of the present invention) of second sheet member 203 represented by the second data as in image I5 and I6. The inspection result of roll member 204 having such a cross-sectional shape is "poor" because the first virtual line and the second virtual line do not intersect each other in roll member 204 other than defective ones.

In images I3 and I4 illustrated in FIG. 5, the first virtual line of first sheet member 202 does not intersect the second virtual line of second sheet member 203 while the positions of first sheet member 202 are misaligned. The inspection result of roll member 204 having such a shape is "fair".

In images I1 and I2 illustrated in FIG. 5, the amount of positional misalignment of first sheet member 202 is small in comparison with images I3 to I6. The inspection result of roll member 204 having such a cross-sectional shape is "good".

At step S4 in the flowchart illustrated in FIG. 2, roll member 204 whose inspection result is "good" or "fair" is determined to be not a defective product, and roll member 204 whose inspection result is "poor" is determined to be a defective product.

As described above, when the sequence of the positions of the upper end surface represented by the first data intersects the sequence of the positions of the upper end surface represented by the second data, roll member 204 is defective. It is known that the defect in which the sequence of the positions of the upper end surface represented by the first data intersects the sequence of the positions of the upper end surface represented by the second data is caused due to first supply reel 50, second supply reel 51, first bonding roll 205A, or second bonding roll 205B. In the example illustrated in FIG. 5, a defect in which the sequence of the positions of the upper end surface represented by the first data intersects the sequence of the positions of the upper end surface represented by the second data is caused due to misalignment of the positions of first sheet member 202 supplied by first supply reel 50 and bonded by first bonding roll 205A. In view of this, the cause of the defect of illustrated in FIG. 5 is first supply reel 50 or first bonding roll 205A.

Note that in the example illustrated in FIG. 5, "good", "fair", or "poor" is determined based on whether the lines (the first virtual line and the second virtual line) formed of the sequence of the positions of the upper end surfaces of first sheet member 202 and second sheet member 203 intersect or not. However, the present invention is not limited to this, and "good", "fair", or "poor" may be determined based on whether the sequence of the positions of the lower end surface intersect or not.

Maintenance Display Apparatus 100

Next, a functional configuration and an operation of maintenance display apparatus 100 that displays a maintenance operation of production apparatus 200 described above are elaborated. Note that the maintenance operation in the present embodiment means an operation for preventing defects of roll member 204 produced by production apparatus 200 by appropriately performing adjustment of each component, replacement of components and the like in production apparatus 200. In the present invention, in particular, the maintenance operation is an operation for maintaining defects of first supply reel 50 and first bonding roll 205A of the above-described production apparatus 200. The maintenance operation is performed by an operator or the like who practically handles production apparatus 200.

Storage Section 110

Figure 6:
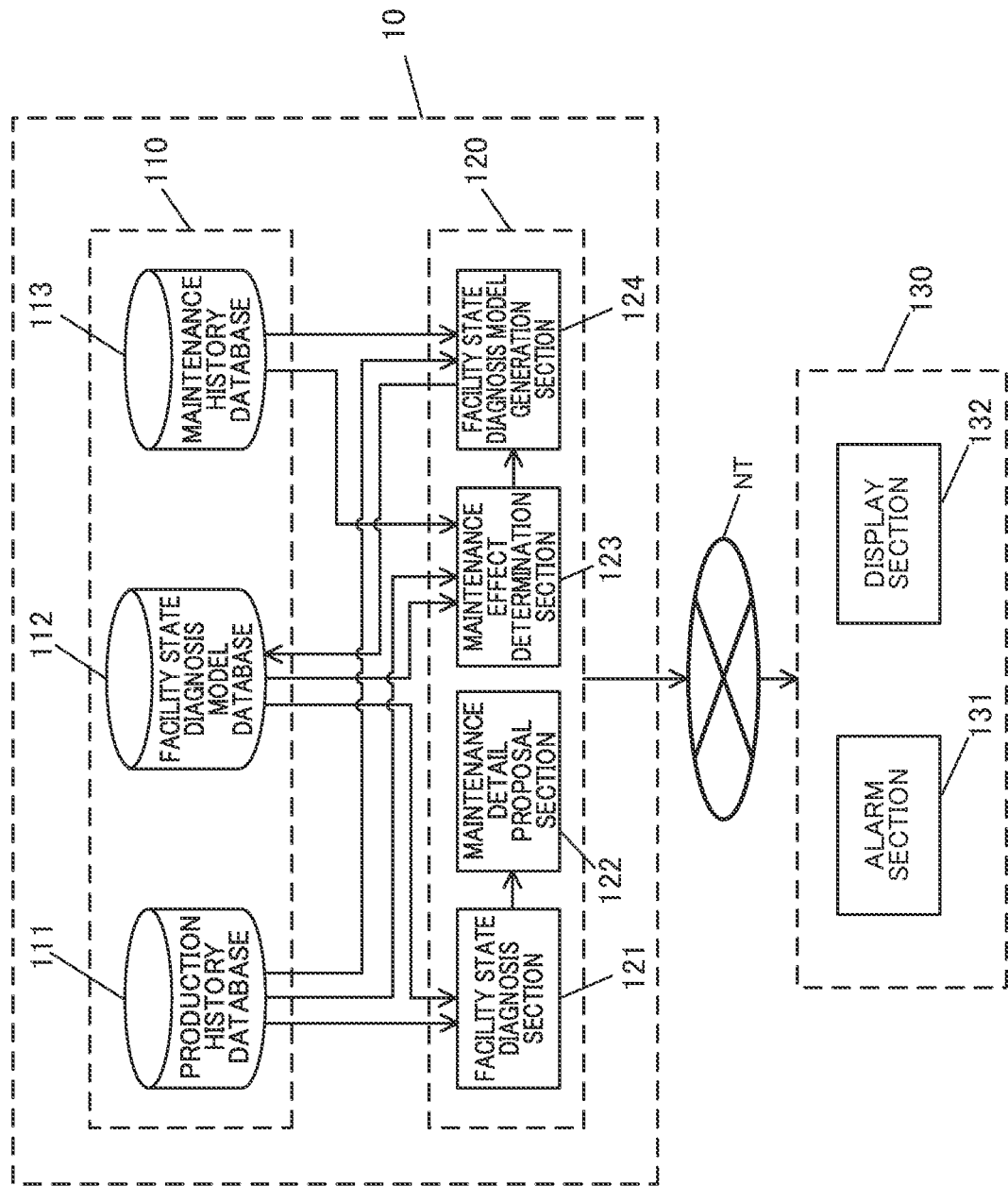
FIG. 6 is a block diagram illustrating an example of a functional configuration of the maintenance display apparatus according to Embodiment 1.

FIG. 6 is a block diagram illustrating an example of a functional configuration of maintenance display apparatus 100 according to Embodiment 1. As described above, maintenance display apparatus 100 includes storage section 110, control section 120 and notification section 130 (see FIG. 1).

As illustrated in FIG. 6, storage section 110 includes production history database 111, facility state diagnosis model database 112, and maintenance history database 113.

Production history database 111 is a database in which production history data related to the production history of production apparatus 200 is registered. The production history data includes the production date and time of produced roll member 204 and the shape data of roll member 204.

Figures 7A, 7B:
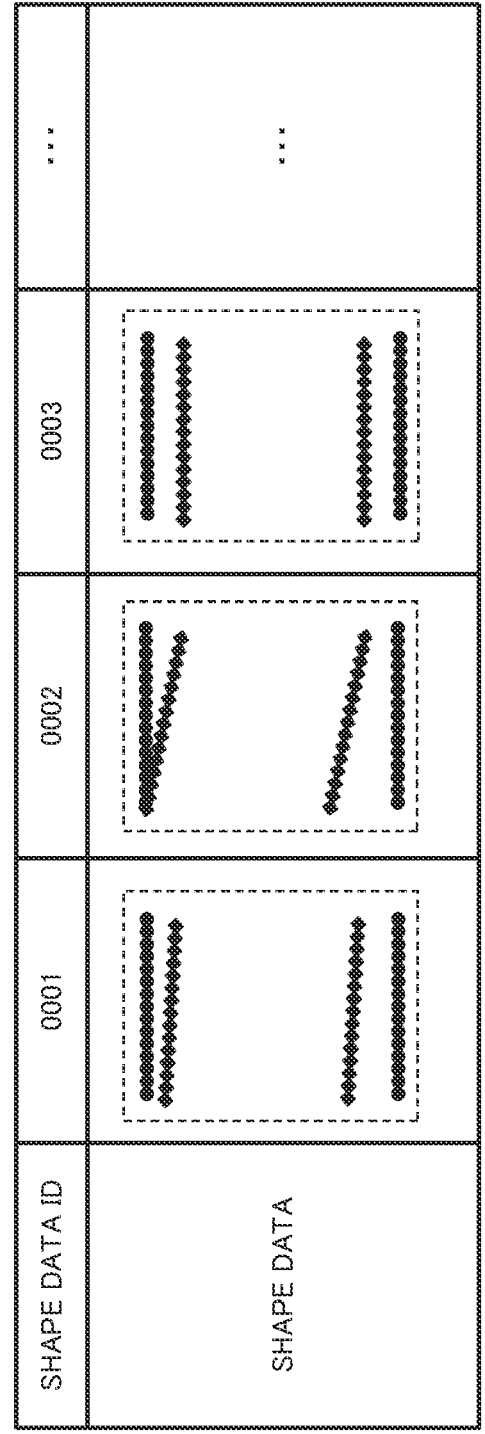
FIG. 7A is a diagram illustrating an example of production history data.
FIG. 7B is a diagram illustrating an example of production history data.

FIG. 7A and FIG. 7B are diagrams illustrating an example of production history data PD. FIG. 7A illustrates a table of a part of production history data PD. As illustrated in FIG. 7A, production history data PD includes data of "production date and time", "facility", "inspection result", "first sheet member", "second sheet member", "shape data ID" and the like.

The "production date and time" data is data related to the production date and time when roll member 204 was produced. The "facility" data is data for identifying the facility where the production history has been made in the case where there is a plurality of production apparatuses 200. FIG. 7A illustrates exemplary identifiers "A", "B" and "C" of production apparatuses 200 different from each other.

The "inspection result" data is data representing an inspection result (see FIG. 5) of roll member 204 produced in production apparatus 200. FIG. 7A illustrates examples of inspection results of three levels "good", "fair" and "poor".

The "first sheet member" data and the "second sheet member" data are data related to the material used for producing data roll member 204. As the "first sheet member" data and the "second sheet member" data, identifiers for identifying respective materials are stored.

The "shape data ID" is the identification number associated with the shape data (see FIG. 5) representing the cross-sectional shape of roll member 204. FIG. 7B illustrates an example of a correspondence relationship between shape data ID and shape data.

Of the above-described production history data PD, each data except for the shape data is automatically input, or manually input by the operator, and registered in production history database 111 each time when roll member 204 is produced in production apparatus 200. The shape data is generated when produced roll member 204 is inspected by inspection machine 207 (see FIG. 1 or FIG. 4A), and registered in association with shape data ID. That is, in production history data PD, the shape data of roll member 204 is virtually included. In this manner, each time when roll member 204 is produced, production history data PD of produced roll member 204 is registered in production history database 111.

Facility state diagnosis model database 112 is a database in which a plurality of facility state diagnosis models M is registered. Facility state diagnosis model M is a learned model that serves as a reference for the diagnosis and is used for the diagnosis whether the maintenance operation is required for production apparatus 200. Facility state diagnosis model M is a learned model in which the type of defects and the type of the maintenance operation effective for the defects are learned in the case where production apparatus 200 where defective products have been produced is improved (the production ratio of defective products is reduced) by a maintenance operation. To be more specific, facility state diagnosis model M is aggregate data including the shape data of the roll member including a plurality of defective products and the details of the maintenance operations performed for improving the defective products. Facility state diagnosis model M is generated by facility state diagnosis model generation section 124 described later.

Facility state diagnosis model M is generated at each maintenance operation that has reduced the production ratio of defective products in production of roll members after that maintenance operation. Specifically, for example, facility state diagnosis model M of the maintenance operation performed yesterday and facility state diagnosis model M of the maintenance operation performed today are generated independently of each other.

In addition, while the format of facility state diagnosis model M is not limited, it is preferable to employ a machine learning model such as a neural network model, in order to further improve the accuracy of the diagnosis. Selection of the model employed for facility state diagnosis model M may be made by the user of maintenance display apparatus 100 from an operation section not illustrated and the like, or by facility state diagnosis model generation section 124.

Maintenance history database 113 is a database in which maintenance history data MD related to the maintenance operation actually performed for production apparatus 200 is registered. Maintenance history data MD includes, for example, facility data for identifying production apparatus 200, data related to the date and time (maintenance date and time) when the maintenance operation was performed, data representing the details of the performed maintenance operation, and the like. In the case where the maintenance operation that is completed in a short time of, e.g., several minutes, the maintenance date and time may be the start time or end time of the maintenance operation, for example. In the case where the maintenance operation takes a long time of, e.g., several hours, the maintenance date and time is preferably the middle time of the maintenance operation, for example. FIG. 8 is a diagram illustrating an example of maintenance history data MD. Through an operation section not illustrated in FIG. 1 and the like, maintenance history data MD is manually input to maintenance display apparatus 100 by the operator or the like who has actually performed the maintenance operation of production apparatus 200 immediately after the maintenance operation is executed.

Control Section 120

As illustrated in FIG. 6, control section 120 includes facility state diagnosis section 121, notification determination section 122, maintenance effect determination section 123, and facility state diagnosis model generation section 124.

Facility state diagnosis section 121 diagnoses the state of production apparatus 200 using facility state diagnosis model M and the shape data of roll member 204 newly produced in production apparatus 200. The diagnosis result is calculated as match rate C representing the degree of match between the shape data of the newly produced roll member 204 and the past shape data included in facility state diagnosis model M. Here, facility state diagnosis model M includes the details of the maintenance operation and the shape data prior to the time point when that maintenance operation is performed. This means that the defect of roll member 204 has been reduced by performing the maintenance operation included in facility diagnosis model M when the defect of roll member 204 having the shape data included in facility state diagnosis model M has occurred in the past. That is, match rate C between the shape data of the newly produced roll member 204 and the shape data included in facility diagnosis model M indicates the probability that the defect of roll member 204 is improved by performing the maintenance included in facility state diagnosis model M.

Notification determination section 122 determines whether to perform a notification related to the maintenance operation of production apparatus 200 on the basis of match rate C. Notification determination section 122 determines that a notification that the maintenance operation should be performed is to be performed when match rate C is equal to or greater than a predetermined threshold value, and determines that the notification is not to be performed when match rate C is smaller than the predetermined threshold value. The notification related to the maintenance operation includes an alarm for drawing attention of the user, indication of the details of a maintenance operation that is expected to be effective, and the like.

Maintenance effect determination section 123 determines the effectiveness of the maintenance operation on production apparatus 200. Maintenance effect determination section 123 determines the effectiveness of the maintenance operation on the basis of the defect rates before and after the maintenance operation (the ratio of the defective product with respect to the total production), or the shape data of roll member 204 before and after the maintenance operation (see FIG. 5), for example.

Facility state diagnosis model generation section 124 generates facility state diagnosis model M on the basis of maintenance history data MD determined to be effective and the shape data of the defective product that has been produced before the maintenance operation is performed. Facility state diagnosis model M generated by facility state diagnosis model generation section 124 is registered in the above-described facility state diagnosis model database 112.

Entire Flow of Processes in Maintenance Display Apparatus 100

Figure 9:
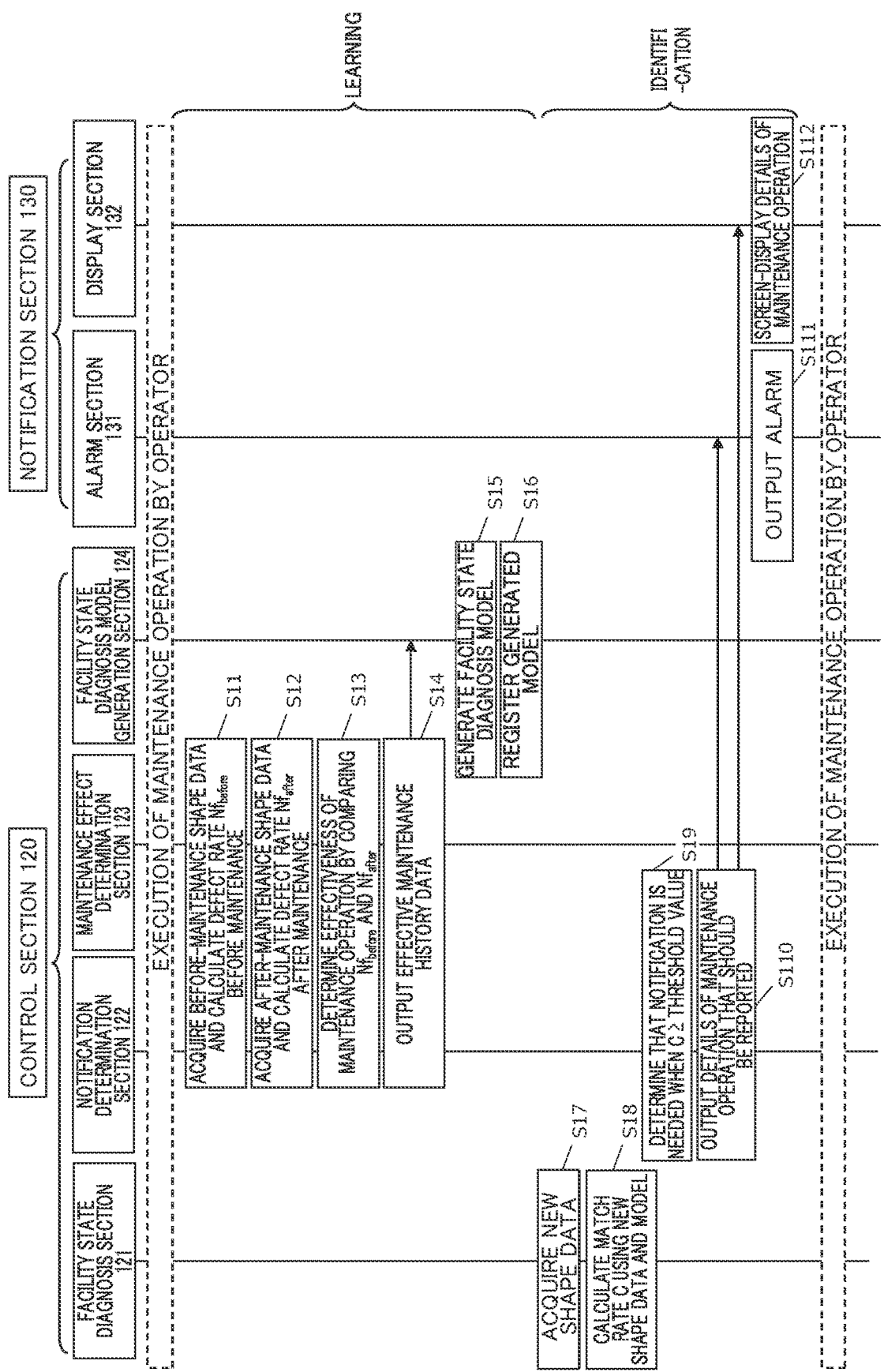
FIG. 9 is a sequence diagram schematically illustrating an entire flow of processes in the maintenance display apparatus.
Figure 10:
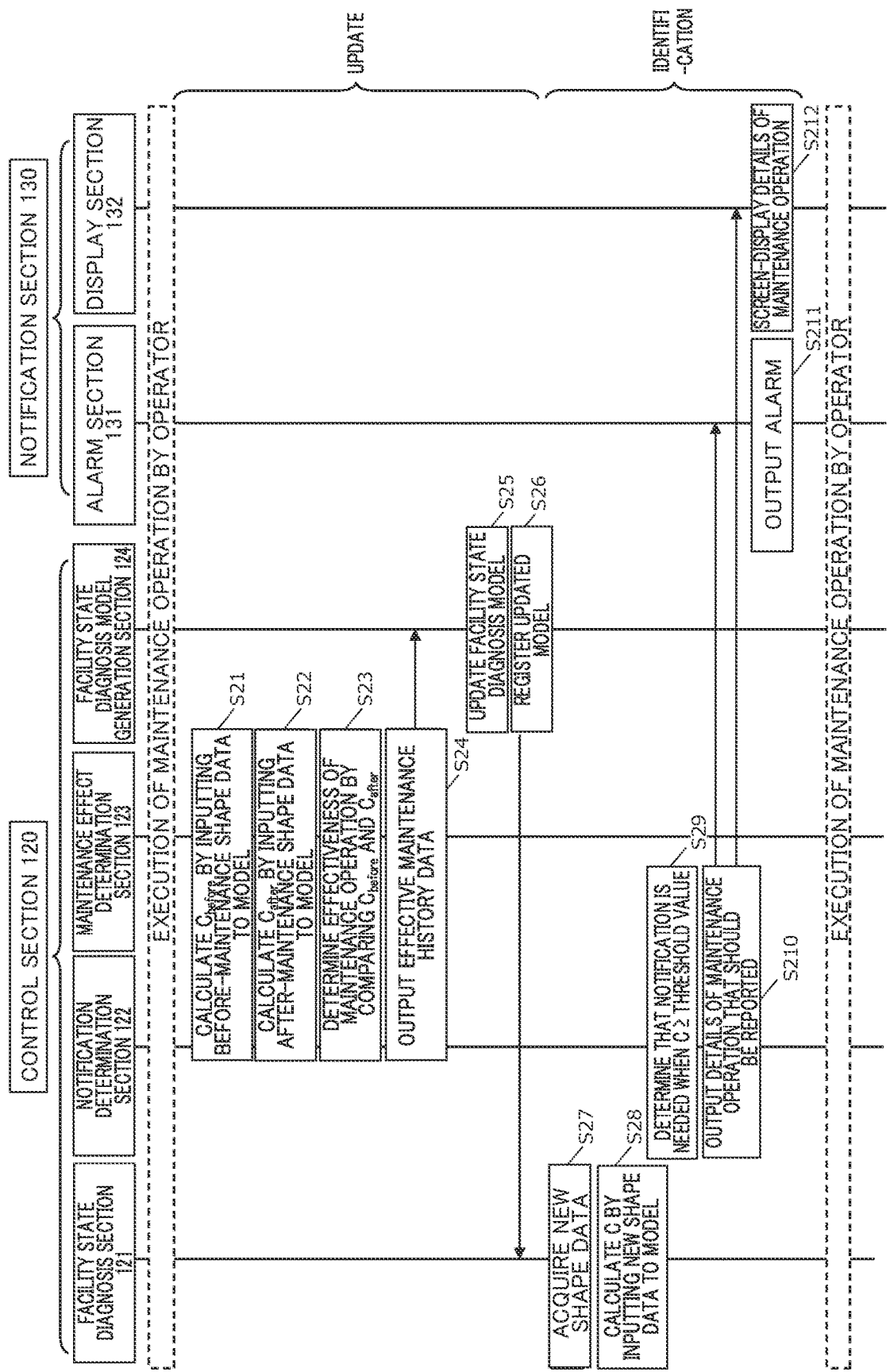
FIG. 10 is a sequence diagram schematically illustrating an entire flow of processes in the maintenance display apparatus.

Next, the entire flow of processes in maintenance display apparatus 100 having the functional configuration illustrated in FIG. 6 is described with reference to FIG. 9 and FIG. 10. FIG. 9 and FIG. 10 are sequence diagrams schematically illustrating an entire flow of processes in maintenance display apparatus 100.

FIG. 9 illustrates an overview of a learning process in maintenance display apparatus 100 and an identification process using a learned model generated through the learning process.

Learning Process

The learning process in maintenance display apparatus 100 is a process for generating a learned model (facility state diagnosis model M) in which in the case where a defective product is produced by production apparatus 200, the type of the shape data of the defective product and the type of the maintenance operation that has improved the defective product are learned. In view of this, it is assumed that a maintenance operation has been performed before the learning process is started.

At step S11, maintenance effect determination section 123 acquires the shape data (see FIG. 5) included in production history data PD (see FIG. 7A) of a plurality of roll members 204 that has produced further before the maintenance operation performed before the start of the learning process, and calculates defect rate $Nf_{before}$ before the maintenance operation on the basis of the acquired data. Defect rate $Nf_{before}$ is calculated by dividing the number of roll members 204 determined to be defective among roll members 204 manufactured before the maintenance operation, by the total production before the maintenance operation, for example.

At step S12, maintenance effect determination section 123 acquires the shape data included in production history data PD of a plurality of roll members 204 produced after the maintenance operation, and calculates defect rate $Nf_{after}$ after the maintenance operation on the basis of the acquired data. Defect rate $Nf_{after}$ is calculated by dividing the number of roll members 204 determined to be defective among roll members 204 manufactured after the maintenance operation, by the total production after the maintenance operation, for example.

At step S13, maintenance effect determination section 123 determines whether the maintenance operation has an effect by comparing defect rates $Nf_{before}$ and $Nf_{after}$ before and after the maintenance operation. The process of determining the effect of the maintenance operation maintenance effect determination section 123 in the learning process is elaborated later.

When it is determined at step S13 that the maintenance operation has an effect, maintenance effect determination section 123 outputs maintenance history data MD (see FIG. 8) representing the details of the maintenance operation performed before the start of the learning process to facility state diagnosis model generation section 124 at step S14.

At step S15, facility state diagnosis model generation section 124 generates facility state diagnosis model M by using maintenance history data MD determined to be effective. Facility state diagnosis model M is elaborated later.

At step S16, facility state diagnosis model generation section 124 registers the generated facility state diagnosis model M in facility state diagnosis model database 112 (see FIG. 6).

The above-described processes from step S11 to step S16 are the learning process of maintenance display apparatus 100.

Identification Process

The identification process described below is a process of determining whether an abnormality or a sign of an abnormality is caused in production apparatus 200 by using facility state diagnosis model M generated through the learning process on the basis of the shape data representing the cross-sectional shapes of a plurality of newly produced roll members 204.

At step S17, facility state diagnosis section 121 acquires the shape data of a plurality of newly produced roll members (hereafter, new shape data).

At step S18, facility state diagnosis section 121 calculates match rate C by using the new shape data and facility state diagnosis model M. Match rate C is a value representing the degree of matching between the new shape data and the past shape data included in facility state diagnosis model M. That is, the larger the match rate C, the higher the probability that newly produced roll member 204 is a defective product, with an abnormality or a sign of an abnormality caused in production apparatus 200.

At step S19, notification determination section 122 determines that the notification to the user of maintenance display apparatus 100 is required when match rate C is equal to or greater than a predetermined threshold value. The case where match rate C is equal to or greater than the predetermined threshold value is a case where there is an abnormality or a sign of an abnormality in production apparatus 200, and a maintenance operation is required anew.

At step S110, notification determination section 122 outputs, to notification section 130, the details of the maintenance operation that should be reported to the user. The details of the maintenance operation that should be reported to the user are determined based on facility state diagnosis model M whose match rate C is equal to or greater than the predetermined threshold value.

At steps S111 and S112, notification section 130 makes a notification that the maintenance operation should be performed, to the user. At step S111, alarm section 131 issues an alarm. In addition, at step S112, display section 132 displays the details of the maintenance operation that should be reported to the user and the like. Note that while FIG. 9 illustrates an example where both the alarm at step S111 and the display of the details of the maintenance operation at step S112 are performed, only the display of the details of the maintenance operation may be performed without issuing the alarm, for example.

As described above, with the notification at steps S111 and S112, the operator who has received the notification executes the maintenance operation on production apparatus 200 on the basis of that notification of the details of the maintenance operation.

The above-described processes from step S17 to step S112 are the identification process of maintenance display apparatus 100 using learned model generated by the learning process.

FIG. 10 illustrates overviews of an update process in maintenance display apparatus 100 and an identification process using a learned model updated by the update process.

Update Process

The update process in maintenance display apparatus 100 is a process of updating the learned model (facility state diagnosis model M) on the basis of a maintenance operation result of a maintenance operation when the maintenance operation is performed anew after the above-described learning process. That is, the update process is based on the assumption that a maintenance operation is performed before the start of the update process.

At step S21, maintenance effect determination section 123 calculates match rate $C_{before}$ before the maintenance operation by using the shape data (see FIG. 5) included in production history data PD (see FIG. 7A) of a plurality of roll members 204 produced before the maintenance operation, and facility state diagnosis model M registered in facility state diagnosis model database 112.

At step S22, maintenance effect determination section 123 calculates match rate $C_{after}$ after the maintenance operation by using the shape data included in the operation production history data of the plurality of roll members 204 produced after the maintenance, and the past shape data included in facility state diagnosis model M registered in facility state diagnosis model database 112.

At step S23, maintenance effect determination section 123 determines whether the maintenance operation has an effect by comparing match rates $C_{before}$ and $C_{after}$ before and after the maintenance operation. The process of determining the effect of the maintenance operation at maintenance effect determination section 123 in the update process is elaborated later.

When it is determined that the maintenance operation has an effect at step S23, maintenance effect determination section 123 outputs, to facility state diagnosis model generation section 124, maintenance history data MD representing the details of the maintenance operation performed before the start of the update process at step S24.

At step S25, facility state diagnosis model generation section 124 updates facility state diagnosis model M by using maintenance history data MD determined to be effective. The update process of facility state diagnosis model M is elaborated later.

At step S26, facility state diagnosis model generation section 124 updates facility state diagnosis model database 112 (see FIG. 6) using generated facility state diagnosis model M.

The above-described processes from step S21 to step S26 are the update process of maintenance display apparatus 100.

Identification Process

The identification process described below is a process of determining whether an abnormality or a sign of an abnormality is caused in production apparatus 200 by using facility state diagnosis model M updated by the update process on the basis of the shape data representing the cross-sectional shapes of a plurality of newly produced roll members 204.

At step S27, facility state diagnosis section 121 acquires the shape data of a plurality of newly produced roll members (hereafter, new shape data).

At step S28, facility state diagnosis section 121 calculates match rate C by using the new shape data and facility state diagnosis model M. Match rate C is a value representing the degree of matching between the new shape data and the past shape data included in facility state diagnosis model M.

At step S29, notification determination section 122 determines that the notification to the user of maintenance display apparatus 100 is required when match rate C is equal to or greater than a predetermined threshold value. The case where match rate C is equal to or greater than the predetermined threshold value is a case where there is an abnormality or a sign of an abnormality in production apparatus 200, and a maintenance operation is required anew.

At step S210, notification determination section 122 outputs, to notification section 130, the details of the maintenance operation that should be reported to the user. The details of the maintenance operation that should be reported to the user are determined based on facility state diagnosis model M whose match rate C is equal to or greater than the predetermined threshold value.

At steps S211 and S212, notification section 130 makes a notification that the maintenance operation should be performed, to the user. At step S211, alarm section 131 issues an alarm. In addition, at step S212, display section 132 displays the details of the maintenance operation that should be reported to the user and the like. Note that while FIG. 10 illustrates an example where both the alarm at step S211 and the display of the details of the maintenance operation step S212 are performed, only the display of the details of the maintenance operation may be performed without issuing the alarm, for example.

The operator who has received the notification at steps S211 and S212 executes the maintenance operation on production apparatus 200 on the basis of that notification of the details of the maintenance operation.

The above-described processes from step S27 to step S212 are the identification process of maintenance display apparatus 100. Note that the identification process from step S27 to step S212 illustrated in FIG. 10 is substantially the same as the identification process from step S17 to step S112 illustrated in FIG. 9.

Details of Each Process

The learning process, the identification process, and the update process illustrated in FIG. 9 and FIG. 10 are elaborated below.

Learning Process

First, the learning process at maintenance effect determination section 123 and facility state diagnosis model generation section 124 is described.

Process of Maintenance Effect Determination Section 123

Figure 11:
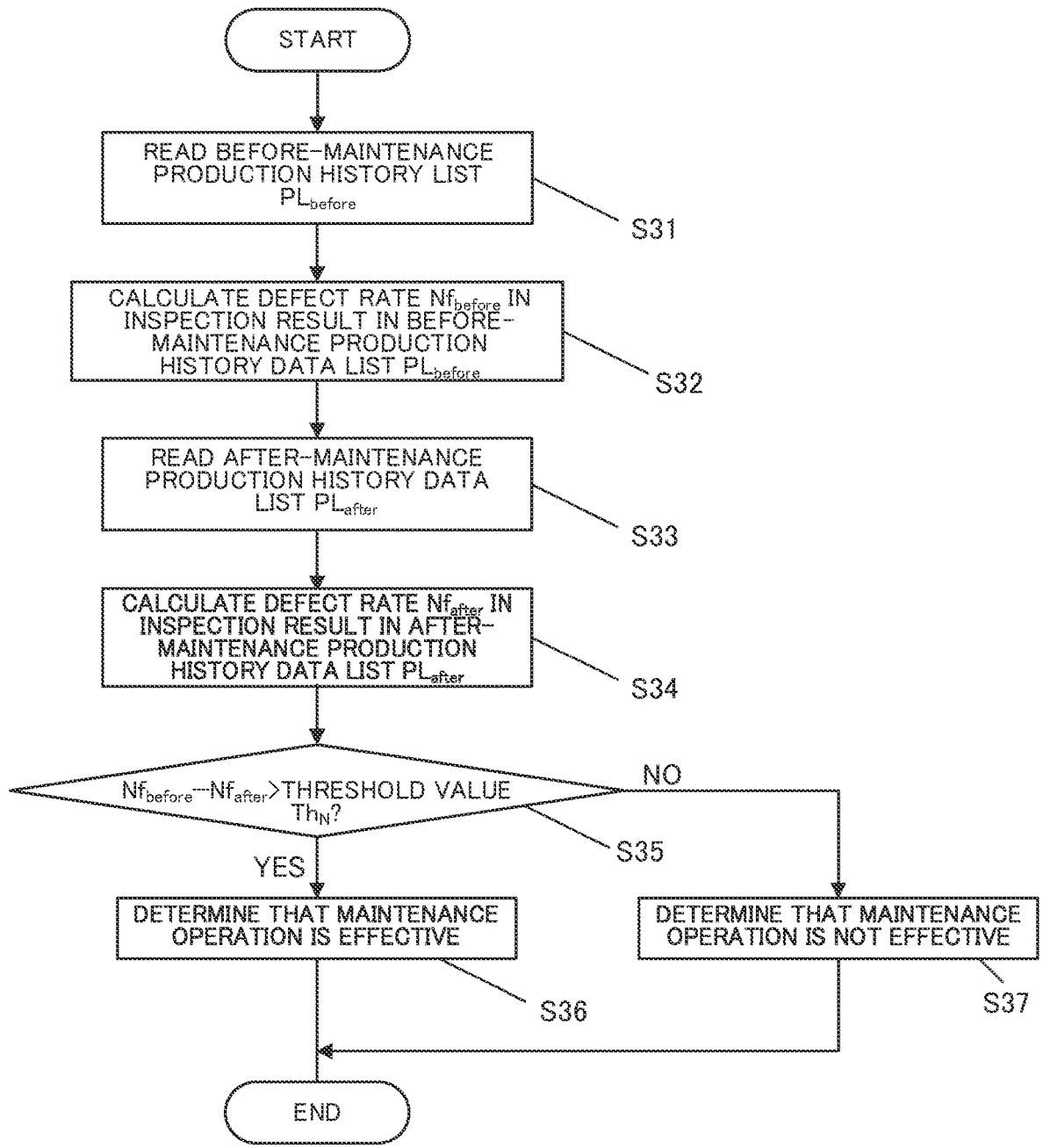
FIG. 11 is a flowchart for describing processes executed by a maintenance effect determination section in a learning process.

Processes executed by maintenance effect determination section 123 in the learning process (processes from step S11 to step S14 in FIG. 9) are described below. FIG. 11 is a flowchart of the processes executed by maintenance effect determination section 123 in the learning process.

At step S31, maintenance effect determination section 123 reads, from production history database 111, production history data list $PL_{before}$ including all production history data of roll member 204 produced in a period of a predetermined time after the time when the maintenance operation is performed prior to the learning process among the production history data registered in production history database 111. The predetermined time is a time with a duration set in advance, and is a time required for manufacturing roll members 204 of a certain number or more.

At step S32, maintenance effect determination section 123 calculates before-maintenance defect rate $Nf_{before}$ on the basis of the production history data included in production history data list $PL_{before}$. As described above, before-maintenance defect rate $Nf_{before}$ is calculated by dividing the number of roll members 204 determined to be defective by the total production before the maintenance operation on the basis of the inspection result and the shape data of the production history data included in production history data list $PL_{before}$.

At step S33, maintenance effect determination section 123 reads, from production history database 111, production history data list $PL_{after}$ including all the production history data of roll member 204 produced in a period of a predetermined time after the time when the maintenance is performed.

At step S34, maintenance effect determination section 123 calculates after-maintenance defect rate $Nf_{after}$ on the basis of the production history data included in production history data list $PL_{after}$. As described above, after-maintenance defect rate $Nf_{after}$ is calculated by dividing the number of roll members 204 determined to be defective by the total production after the maintenance operation on the basis of the inspection result and the shape data of the production history data included in production history data list $PL_{after}$.

At step S35, maintenance effect determination section 123 determines the difference between before-maintenance defect rate $Nf_{before}$ and after-maintenance defect rate $Nf_{after}$, and determines whether the difference is greater than predetermined threshold value $Th_N$. Maintenance effect determination section 123 proceeds the process to step S36 when the difference is greater than threshold value $Th_N$ (step S35: YES), and maintenance effect determination section 123 proceeds the process to step S37 when the difference is not greater than threshold value $Th_N$ (step S35: No).

At step S36, maintenance effect determination section 123 determines that the maintenance operation has an effect because after-maintenance defect rate $Nf_{after}$ is smaller than before-maintenance defect rate $Nf_{before}$. Here, the maintenance operation is a maintenance operation performed before the learning process, i.e., before step S11 in FIG. 9.

On the other hand, at step S37, maintenance effect determination section 123 determines that the maintenance operation has no effect, or has only an extremely small effect because after-maintenance defect rate $Nf_{after}$ is not smaller than before-maintenance defect rate $Nf_{before}$.

In this manner, maintenance effect determination section 123 determines whether the maintenance operation performed before the learning process has an effect in the learning process.

Figure 12A:
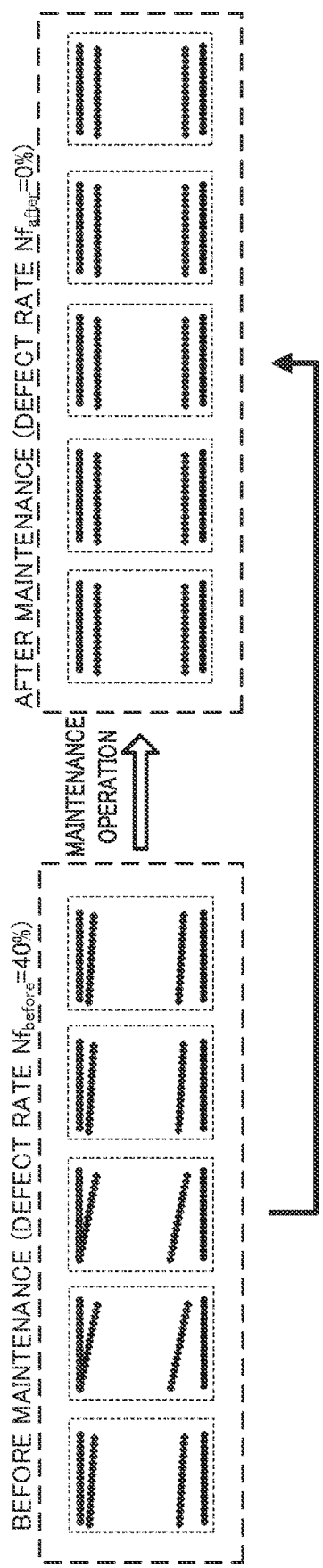
FIG. 12A is a conceptual view for describing a state of determining an effect of a maintenance operation in a learning process.
Figure 12B:
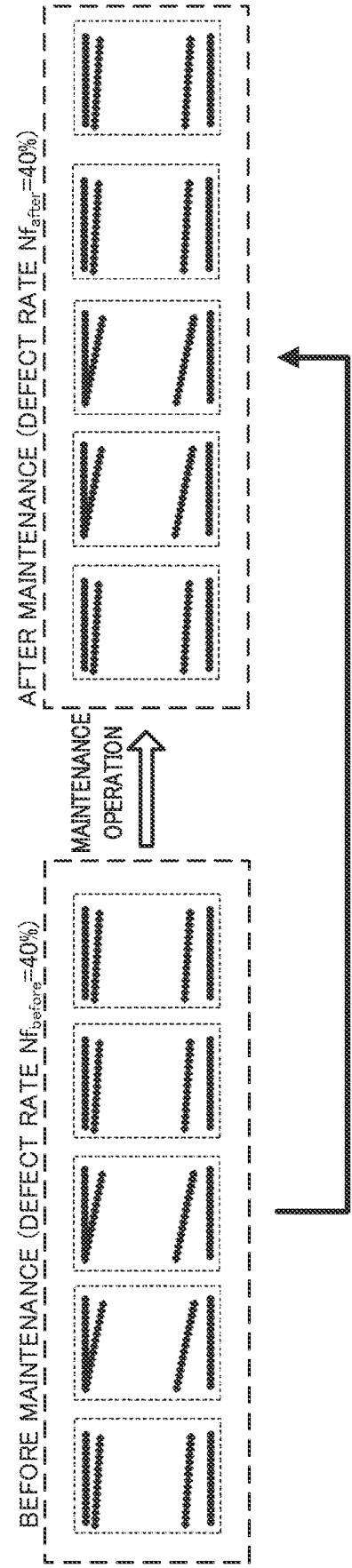
FIG. 12B is a conceptual view for describing a state of determining an effect of a maintenance operation in a learning process.

FIG. 12A and FIG. 12B are conceptual views for describing a state of determining an effect of a maintenance operation in a learning process. FIG. 12A illustrates an example of a case where it is determined that the maintenance operation has an effect, and FIG. 12B illustrates an example of a case where it is determined that the maintenance operation has no effect.

In the example illustrated in FIG. 12A and FIG. 12B, it is determined that two of five roll members produced before the maintenance are defective. That is, before-maintenance defect rate $Nf_{before}$ is 40%. In the example illustrated in FIG. 12A, no roll member is determined to be defective (after-maintenance defect rate $Nf_{after}$=0) among five roll members produced after the maintenance. On the other hand, in the example illustrated in FIG. 12B, two roll members are determined to be defective (after-maintenance defect rate $Nf_{after}$=40%) among five roll members produced after the maintenance, as before the maintenance.

Therefore, in the example illustrated in FIG. 12A, the difference between before-maintenance defect rate $Nf_{before}$ and after-maintenance defect rate $Nf_{after}$ is 40%. On the other hand, in the example illustrated in FIG. 12B, the difference between before-maintenance defect rate $Nf_{before}$ and after-maintenance defect rate $Nf_{after}$ is 0. Therefore, in the case where threshold value $Th_N$ for determining whether the maintenance has an effect is 20% for example, it is determined that the maintenance operation has an effect in the example illustrated in FIG. 12A, whereas it is determined that the maintenance operation has no effect in the example illustrated in FIG. 12B.

Process of Facility State Diagnosis Model Generation Section 124

Figure 13:
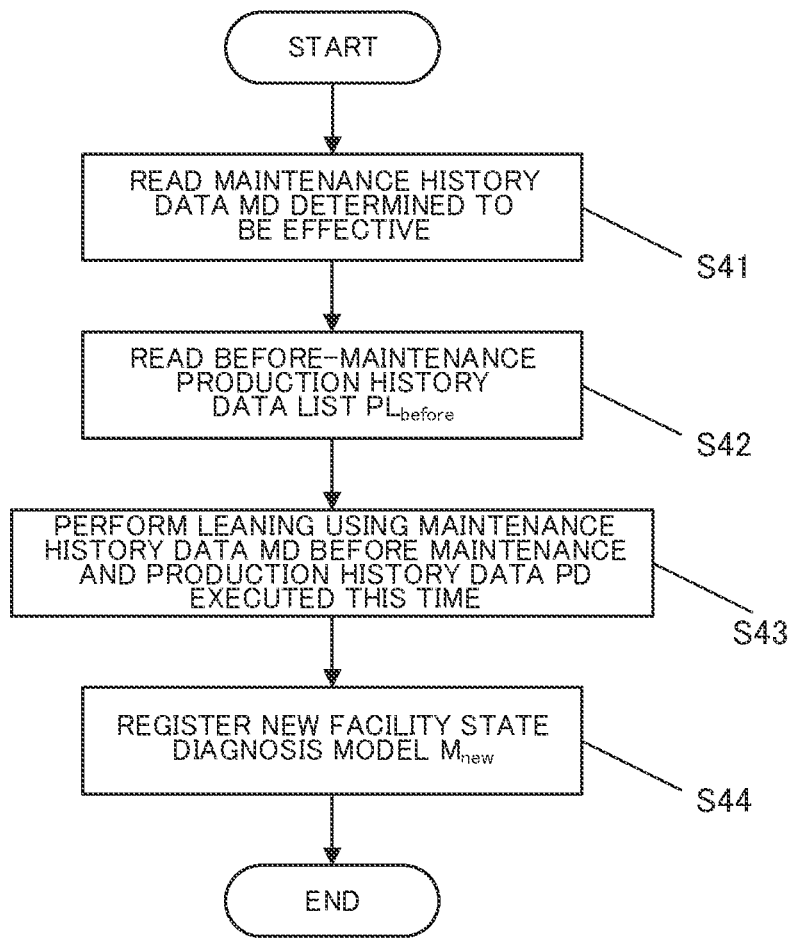
FIG. 13 is a flowchart for describing processes executed by a facility state diagnosis model generation section in a learning process.

Next, processes executed by facility state diagnosis model generation section 124 in the learning process (processes of steps S15 and S16 in FIG. 9) are described. FIG. 13 is a flowchart of is a process executed by facility state diagnosis model generation section 124 in the learning process.

At step S41, facility state diagnosis model generation section 124 reads maintenance history data MD of the maintenance operation determined to be effective at maintenance effect determination section 123.

At step S42, facility state diagnosis model generation section 124 reads before-maintenance production history data list $PL_{before}$ from production history database 111. Note that before-maintenance production history data list $PL_{before}$ read here by facility state diagnosis model generation section 124 is the same as before-maintenance production history data list $PL_{before}$ that is read in the process of maintenance effect determination section 123 (see step S31 in FIG. 11).

At step S43, facility state diagnosis model generation section 124 generates facility state diagnosis model $M_{new}$ by using read maintenance history data MD and production history data PD included in production history data list $PL_{before}$.

At step S44, facility state diagnosis model generation section 124 registers newly generated facility state diagnosis model $M_{new}$ in facility state diagnosis model database 112.

In this manner, in the learning process, facility state diagnosis model $M_{new}$ in which the type of the shape data of the defective product and the type of the maintenance operation that has improved the defective product are learned is generated anew, and registered in facility state diagnosis model database 112.

Identification Process

Next, an identification process at facility state diagnosis section 121 and notification determination section 122 is described.

Process of Facility State Diagnosis Section 121

Figure 14:
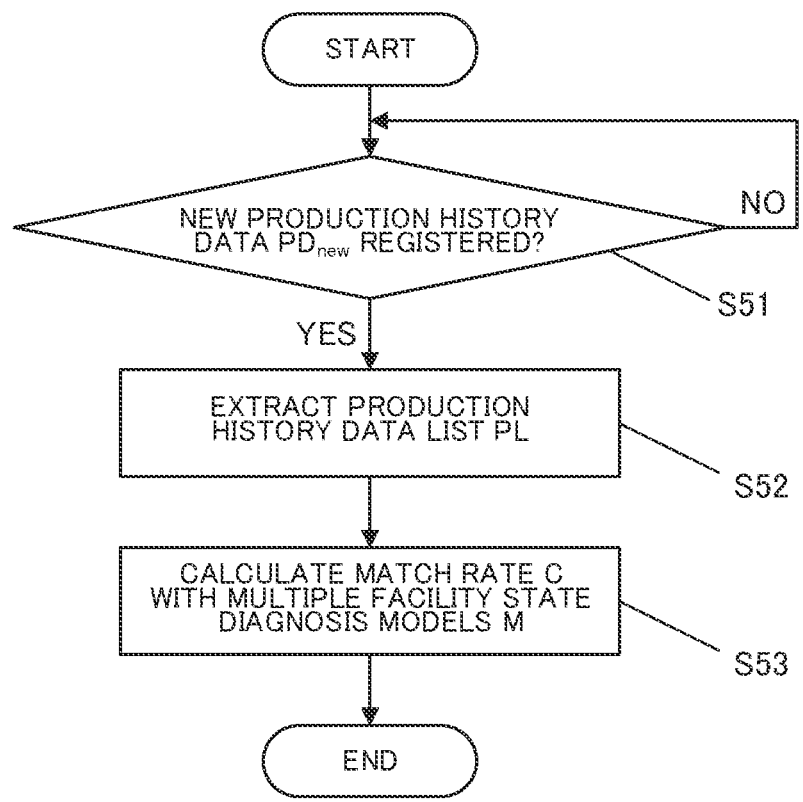
FIG. 14 is a flowchart for describing processes executed by a facility state diagnosis section in an identification process.

Processes executed by facility state diagnosis section 121 in the identification process (processes of step S17 and step S18 in FIG. 9) are described below. FIG. 14 is a flowchart of processes executed by facility state diagnosis section 121 in the identification process.

At step S51, facility state diagnosis section 121 determines whether new production history data $PD_{new}$ has been registered in production history database 111. When new production history data $PD_{new}$ has not been registered (step S51: No), facility state diagnosis section 121 repeats step S51. When new production history data $PD_{new}$ has been registered (step S51: YES), facility state diagnosis section 121 proceeds the process to step S52.

At step S52, facility state diagnosis section 121 extracts production history data list PL from production history database 111 on the basis of newly registered production history data $PD_{new}$. Production history data list PL is a list obtained by extracting production history data PD of roll member 204 produced in a period of a predetermined time from the production date and time of newly registered production history data $PD_{new}$ among the production history data PD registered in production history database 111. That is, at least newly registered production history data $PD_{new}$ is included in production history data list PL.

At step S53, facility state diagnosis section 121 generates match rate C by using the shape data included in production history data list PL and the past shape data included in facility state diagnosis model M read from facility state diagnosis model database 112.

More specifically, facility state diagnosis section 121 extracts shape data (see FIG. 5) from each of one or more production history data included in production history data list PL. On the other hand, facility state diagnosis section 121 extracts a plurality of facility state diagnosis models M registered in facility state diagnosis model database 112. Facility state diagnosis models M correspond to respective maintenance operations different from each other.

Facility state diagnosis section 121 calculates a plurality of match rates C in all combinations of the shape data extracted from one or more production history data and the plurality of facility state diagnosis models M.

Process of Notification Determination Section 122

Figure 15:
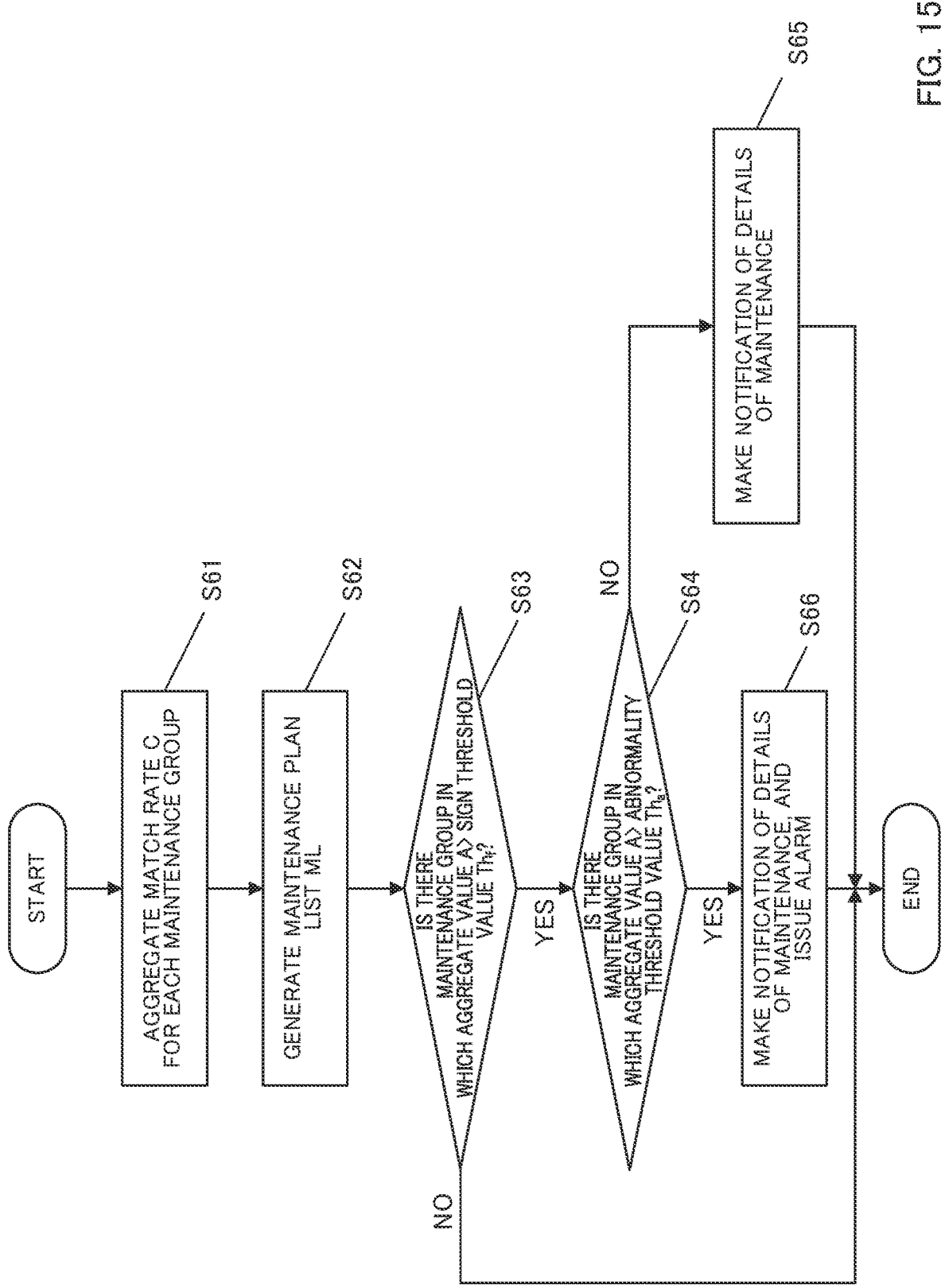
FIG. 15 is a flowchart for describing processes executed by a notification determination section in an identification process.

Processes executed by notification determination section 122 in the identification process (processes of step S19 to step S112 in FIG. 9) are described below. FIG. 15 is a flowchart for describing processes executed by notification determination section 122 in the identification process.

At step S61, notification determination section 122 aggregates match rate C for each maintenance group on the basis of a plurality of match rates C generated by facility state diagnosis section 121. The maintenance group is a group corresponding to the details of the maintenance operation. Note that while the group classified by the details of the maintenance operation is described as the maintenance group in the present embodiment, the present invention is not limited to this, and the maintenance group may be a group classified by the item number or the like of the component replaced in the maintenance operation, for example.

In the following description, a result obtained by aggregating match rate C for each maintenance group is aggregate value A. The method of generating aggregate value A may be appropriately determined from among a plurality of types of aggregated methods. Specific examples of the plurality of types of aggregated methods include a method of simply adding up match rates C, a method of averaging match rates C, a method of selecting a maximum value from among match rates C, a method of extracting and averaging a predetermined number of higher-level match rates C and the like.

At step S62, notification determination section 122 generates maintenance plan list ML. Maintenance plan list ML is a list of the maintenance group, and the maintenance group is arranged in descending order of aggregate value A. FIG. 16 is a diagram illustrating a specific example of maintenance plan list ML.

As illustrated in FIG. 16, maintenance plan list ML includes data such as "maintenance plan ID", "facility", "maintenance plan", and "aggregate value". The "maintenance plan ID" data is an identifier given to for each maintenance group sorted by the size of the aggregate value. As the "maintenance plan ID" data, the greater the aggregate value, the younger the number is given. The "maintenance plan" data is data representing the details of the maintenance corresponding to the maintenance group. The "aggregate value" data is data representing the value of aggregate value A aggregated for each maintenance group.

As described above with reference to FIG. 5, in the case where the sequence of the positions of the upper end surface represented by the first data intersects the sequence of the positions of the upper end surface represented by the second data, it is known that the cause of the defect is first supply reel 50 or first bonding roll 205A. Therefore, in the "maintenance plan" data, data representing details related to the maintenance of first supply reel 50 or first bonding roll 205A is listed.

Aggregate value A is an aggregated value of match rate C, and has a property similar to that of match rate C. Therefore, the greater aggregate value A, the greater the need for the maintenance of the maintenance group to be performed on object production apparatus 200. In addition, maintenance plan list ML is a list of the maintenance group arranged in descending order of aggregate value A, and therefore the higher the level of the maintenance group in maintenance plan list ML, the greater the need for the maintenance of the maintenance group to be performed on object production apparatus 200.

At step S63, notification determination section 122 determines whether aggregate value A is greater than a predetermined sign threshold value $Th_f$ for each maintenance group. The predetermined sign threshold value $Th_f$ is a minimum value of the aggregate value at which production apparatus 200 is expected to have a sign of an abnormality. Note that in the present embodiment, an abnormality of production apparatus 200 means that production apparatus 200 produces roll members 204 with the inspection result of "poor" by a predetermined rate or greater, for example. In addition, a sign of an abnormality of production apparatus 200 means that production apparatus 200 produces roll members 204 with the inspection result of "fair" by a predetermined rate or greater, for example. The predetermined sign threshold value $Th_f$ may be empirically determined based on past maintenance history data MD and the like, for example.

When at least one maintenance group in which aggregate value A is greater than sign threshold value $Th_f$ is included in maintenance plan list ML (step S63: YES), notification determination section 122 proceeds the process to step S64. When no maintenance group in which aggregate value A is greater than sign threshold value $Th_f$ is included in maintenance plan list ML (step S63: No), notification determination section 122 determines that no notification is required and terminates the process.

At step S64, notification determination section 122 determines whether there is a maintenance group in which aggregate value A is greater than a predetermined abnormality threshold value $Th_a$ in the maintenance group included in maintenance plan list ML. The predetermined abnormality threshold value $Th_a$ is a minimum value of the aggregate value at which the production apparatus 200 is expected to have an abnormality beyond the phase of signs. In view of this, abnormality threshold value $Th_a$ is empirically set as a value greater than sign threshold value $Th_f$ on the basis of past maintenance history data MD and the like, for example. When a maintenance group in which aggregate value A is greater than abnormality threshold value $Th_a$ is included in maintenance plan list ML (step S64: YES), notification determination section 122 proceeds the process to step S66. When no maintenance group in which aggregate value A is greater than abnormality threshold value $Th_a$ is included in maintenance plan list ML (step S64: No), notification determination section 122 proceeds the process to step S65.

At step S65, notification determination section 122 causes display section 132 of notification section 130 to make a notification of the details of the maintenance corresponding to the maintenance group in which aggregate value A is greater than sign threshold value $Th_f$ determined at step S63. More specifically, notification determination section 122 causes display section 132 to display the details of the maintenance operation recommended to be performed with a message "perform the following maintenance" and the like, for example. Note that the details of the maintenance operation recommended to be performed correspond to the "maintenance plan" data included in maintenance plan list ML illustrated in FIG. 16.

In addition, notification determination section 122 makes a notification of maintenance plan ID associated with the maintenance group of the details of the maintenance together with the details of the maintenance operation. By inputting maintenance history data MD and maintenance plan ID that has triggered the maintenance in association with each other when the operator who has performed the maintenance operation inputs maintenance history data MD, it is easy to determine whether the input maintenance history data MD is data corresponding to the maintenance operation that has been executed by being triggered by the notification of maintenance display apparatus 100.

At step S66, as at step S65, notification determination section 122 causes display section 132 to display the details of the maintenance operation, and causes alarm section 131 to issue an alarm for making a notification that object production apparatus 200 has an abnormality. When object production apparatus 200 has an abnormality, not a sign of abnormality, an urgent maintenance operation is required. Therefore, notification determination section 122 immediately notifies the user of maintenance display apparatus 100 of an occurrence of an abnormality by causing alarm section 131 to issue an alarm as well as the display of the details of the maintenance operation at display section 132.

In this manner, in the identification process, whether production apparatus 200 has an abnormality (a situation where defective products are produced at a predetermined rate or more) and/or a sign of an abnormality is determined using production history data PD (especially the shape data) of newly produced roll member 204 and facility state diagnosis model M. When it is determined that there is an abnormality or a sign of an abnormality, it is reported to the user. In this manner, the user can immediately know the abnormality when production apparatus 200 has the abnormality, and know the details of the maintenance operation that should be performed to eliminate the abnormality.

Update Process

Next, an update process at maintenance effect determination section 123 and facility state diagnosis model generation section 124 is described.

Process of Maintenance Effect Determination Section 123

Figure 17:
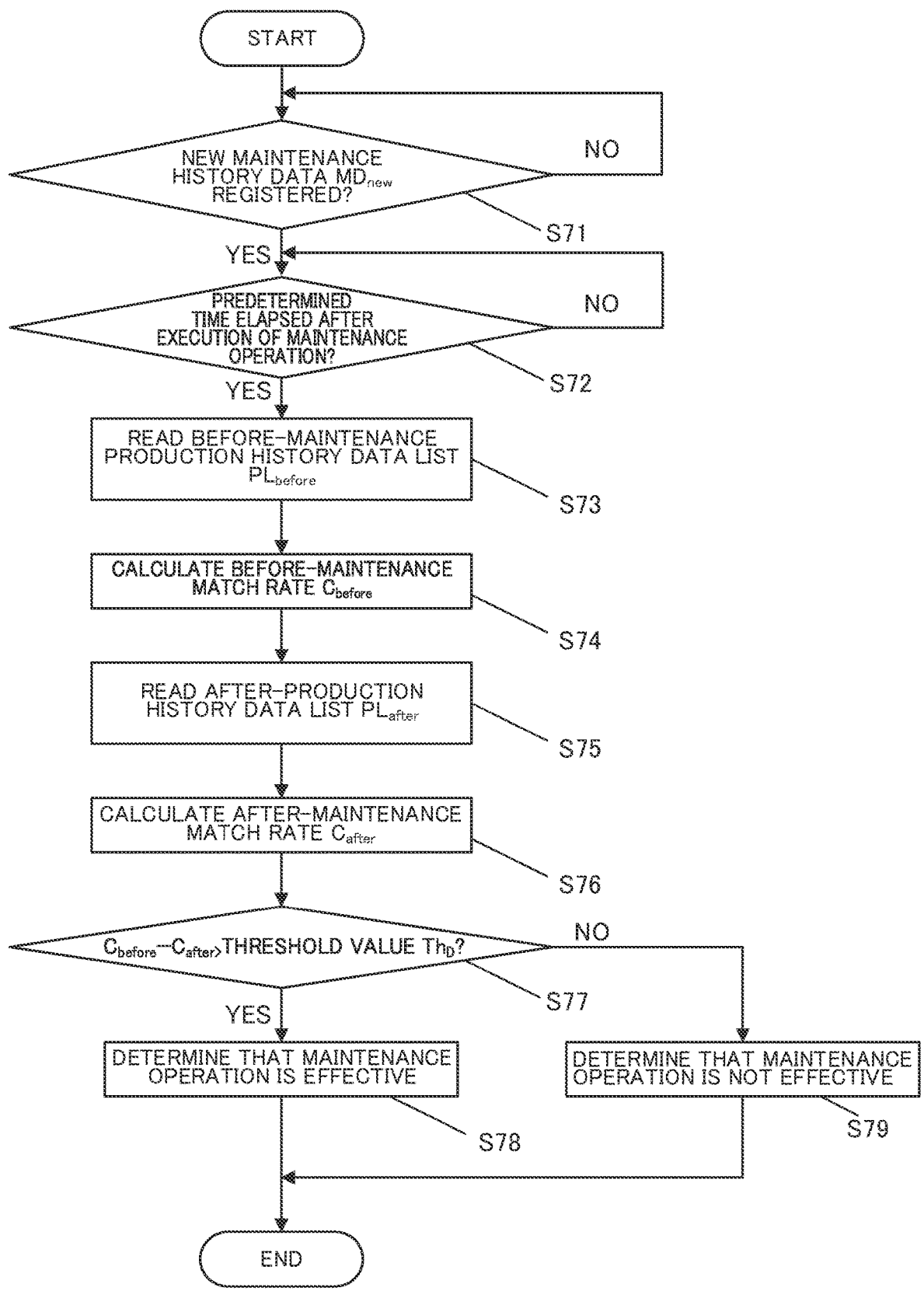
FIG. 17 is a flowchart for describing processes executed by the maintenance effect determination section in an update process.

Processes executed by maintenance effect determination section 123 in the update process (processes of step S21 to step S24 in FIG. 10) are described below. FIG. 17 is a flowchart of processes executed by maintenance effect determination section 123 in the update process.

At step S71, maintenance effect determination section 123 determines whether new maintenance history data $MD_{new}$ is registered in maintenance history database 113 of storage section 110. When it is determined that new maintenance history data $MD_{new}$ is not registered (step S71: No), maintenance effect determination section 123 repeats step S71. When it is determined that new maintenance history data $MD_{new}$ is registered (step S71: YES), maintenance effect determination section 123 proceeds the process to step S72.

At step S72, maintenance effect determination section 123 determines whether a predetermined time has elapsed after the maintenance corresponding to newly registered maintenance history data $MD_{new}$ is performed on the basis of "maintenance date and time" data (see FIG. 8) included in newly registered maintenance history data $MD_{new}$.

When it is determined that a predetermined time has elapsed after the execution time of the maintenance operation (step S72: YES), maintenance effect determination section 123 proceeds the process to step S73. When it is determined that a predetermined time has not elapsed after the execution time of the maintenance operation (step S72: No), maintenance effect determination section 123 repeats the process of step S72.

At step S73, maintenance effect determination section 123 reads, from production history database 111, before-maintenance production history data list $PL_{before}$ including all production history data PD of roll member 204 produced in a period of a predetermined time after the maintenance operation.

At step S74, maintenance effect determination section 123 reads, from facility state diagnosis model database 112, facility state diagnosis model M belonging to the maintenance group of the details of the maintenance corresponding to new maintenance history data $MD_{new}$ and generates before-maintenance match rate $C_{before}$ on the basis of the read facility state diagnosis model M and production history data list $PL_{before}$. The generation method of before-maintenance match rate $C_{before}$ is the same as the generation method of match rate C at facility state diagnosis section 121 at step S53 in FIG. 14.

At step S75, maintenance effect determination section 123 reads, from production history database 111, production history data list $PL_{after}$ including all production history data PD of roll member 204 produced in a period of a predetermined time after the maintenance operation.

At step S76, maintenance effect determination section 123 reads, from facility state diagnosis model database 112, facility state diagnosis model M belonging to the maintenance group of the details of the maintenance corresponding to new maintenance history data $MD_{new}$, and generates after-maintenance match rate $C_{after}$ on the basis of the read facility state diagnosis model M and production history data list $PL_{after}$. The generation method of match rate $C_{after}$ is the same as the generation method of match rate C at facility state diagnosis section 121 at step S53 in FIG. 14.

At step S77, maintenance effect determination section 123 determines the difference between before-maintenance match rate $C_{before}$ and after-maintenance match rate $C_{after}$, and determines whether the difference is greater than predetermined threshold value $Th_D$. Maintenance effect determination section 123 proceeds the process to step S78 when the difference is greater than threshold value $Th_D$ (step S77: YES), and maintenance effect determination section 123 proceeds the process to step S79 when the difference is not greater than threshold value $Th_D$ (step S77: No). Predetermined threshold value $Th_D$ may be appropriately determined based on the history of past maintenance operation and the like.

At step S78, maintenance effect determination section 123 determines that the maintenance operation performed based on the details of the maintenance notified by notification determination section 122 has an effect because after-maintenance match rate $C_{after}$ is smaller than before-maintenance match rate $C_{before}$.

At step S79, maintenance effect determination section 123 determines that the maintenance operation performed based on the details of the maintenance notified by notification determination section 122 has no effect or has only an extremely small effect because after-maintenance match rate $C_{after}$ is not smaller than before-maintenance match rate $C_{before}$.

Figures 18A, 18B:
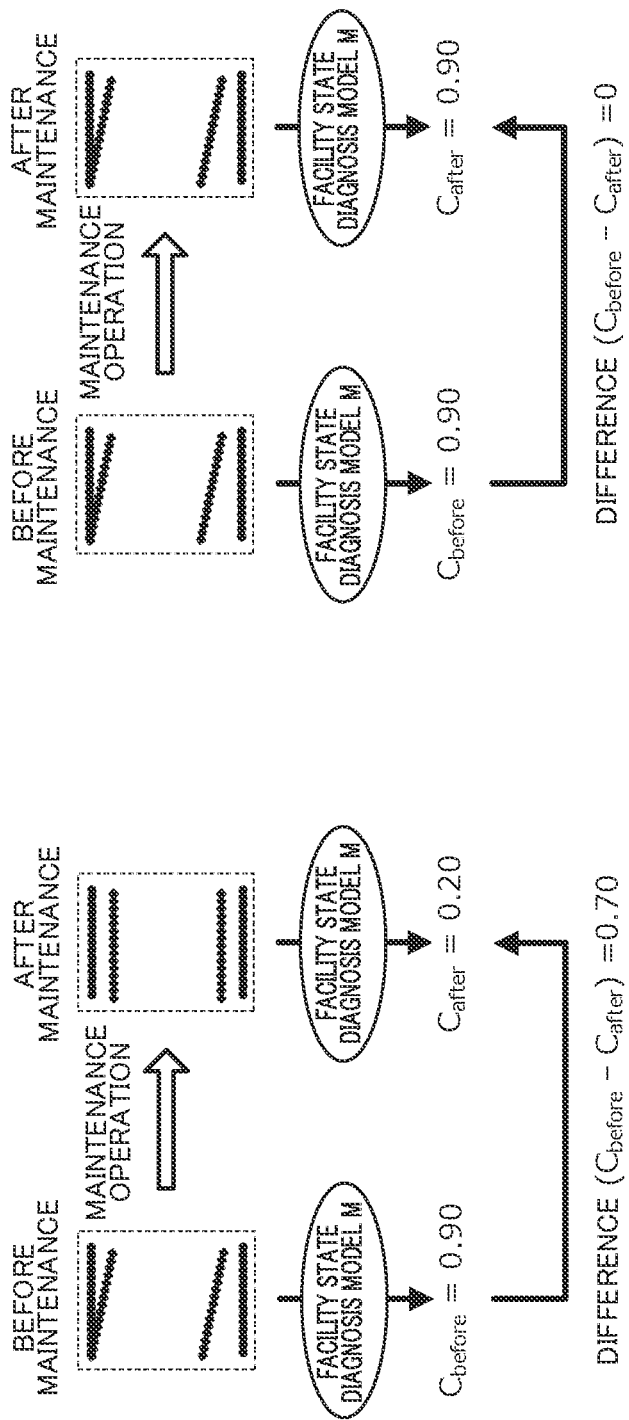
FIG. 18A is a conceptual view for describing a state of determining the effect of a maintenance operation in an update process.
FIG. 18B is a conceptual view for describing a state of determining the effect of a maintenance operation in an update process.

FIG. 18A and FIG. 18B are conceptual views for describing a state of determining the effect of the maintenance operation in the update process. FIG. 18A illustrates an example of a case where it is determined that the maintenance operation has an effect, and FIG. 18B illustrates an example of a case where it is determined that the maintenance operation has no effect.

In the example illustrated in FIG. 18A and FIG. 18B, before-maintenance match rate $C_{before}$=0.90 is calculated from the shape data of roll member 204 produced before the maintenance and facility state diagnosis model M.

Further, in the example illustrated in FIG. 18A, after-maintenance match rate $C_{after}$=0.20 is calculated from the shape data of roll member 204 produced after the maintenance and facility state diagnosis model M. On the other hand, in the example illustrated in FIG. 18B, after-maintenance match rate $C_{after}$=0.90 is calculated from the shape data of roll member 204 produced after the maintenance and facility state diagnosis model M.

Therefore, in the example illustrated in FIG. 18A, the difference between before-maintenance match rate $C_{before}$ and after-maintenance match rate $C_{after}$ is 0.70. On the other hand, in the example illustrated in FIG. 18B, the difference between before-maintenance match rate $C_{before}$ and after-maintenance match rate $C_{after}$ is 0. Therefore, when threshold value $Th_D$ for determining whether the maintenance has an effect is 0.30, for example, it is determined that the maintenance operation has an effect in the example illustrated in FIG. 18A, whereas it is determined that the maintenance operation has no effect in the example illustrated in FIG. 18B.

Process of Facility State Diagnosis Model Generation Section 124

Figure 19:
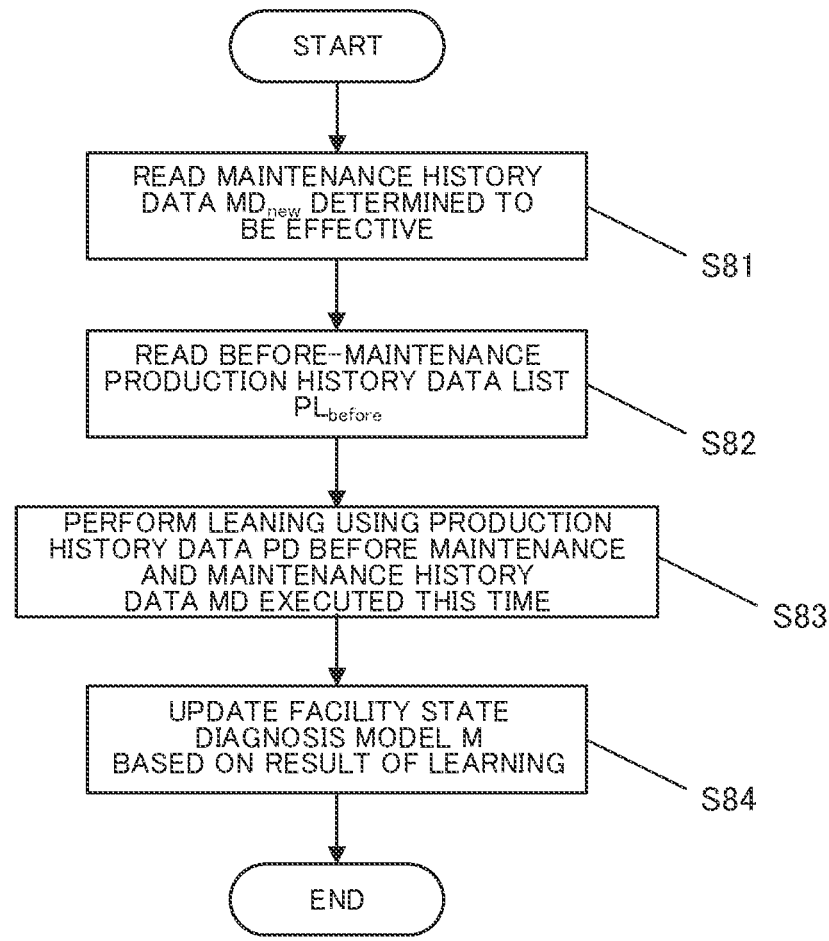
FIG. 19 is a flowchart for describing processes executed by the facility state diagnosis model generation section in an update process.

Next, processes executed by facility state diagnosis model generation section 124 in the update process (processes of step S25 and S26 in FIG. 10) are described. FIG. 19 is a flowchart of processes executed by facility state diagnosis model generation section 124 in the update process.

At step S81, facility state diagnosis model generation section 124 reads maintenance history data $MD_{new}$ of the maintenance operation that is determined to be effective by maintenance effect determination section 123.

At step S82, facility state diagnosis model generation section 124 reads, from production history database 111, before-maintenance production history data list $PL_{before}$. Note that here, before-maintenance production history data list $PL_{before}$ read by facility state diagnosis model generation section 124 is the same as before-maintenance production history data list $PL_{before}$ read in the process of maintenance effect determination section 123 (see step S31 in FIG. 11).

At step S83, facility state diagnosis model generation section 124 generates new facility state diagnosis model $M_{new}$ by using the read maintenance history data MD and production history data PD included in production history data list $PL_{before}$.

At step S84, facility state diagnosis model generation section 124 updates facility state diagnosis model M that is already registered in facility state diagnosis model database 112 by using new facility state diagnosis model $M_{new}$.

In this manner, in the update process, new facility state diagnosis model $M_{new}$ is generated by using facility state diagnosis model M generated in the learning process, and facility state diagnosis model M that is already registered in facility state diagnosis model database 112 is updated by using new facility state diagnosis model $M_{new}$. In this manner, facility state diagnosis model M of facility state diagnosis model database 112 is updated using new facility state diagnosis model $M_{new}$ on the basis of the maintenance operation that has an effect, and thus the accuracy of the facility state diagnosis of production apparatus 200 at facility state diagnosis section 121 is gradually improved.

Operation and Effect of Maintenance Display apparatus 100 of Embodiment 1

As described above, maintenance display apparatus 100 includes notification determination section 122, and facility state diagnosis model generation section 124, which is an example of the model generation section. Notification determination section 122 acquires, from inspection machine 207 serving as a sensor, first data representing a position of a first end surface and second data representing a position of a second end surface read along the radial direction of roll member 204. Notification determination section 122 determines whether roll member 204 is defective on the basis of whether the sequence of the positions of the first end surface represented by the first data intersects the sequence of the positions of the second end surface represented by the second data. When roll member 204 is defective, notification determination section 122 outputs information indicating that the cause of the defect is first supply reel 50 or first bonding roll 205A to display section 132 for maintenance.

Facility state diagnosis model generation section 124 calculates the first difference between the first defect rate of roll member 204 before the maintenance of first supply reel 50 and the second defect rate of roll member 204 after the maintenance of first supply reel 50 on the basis of the first data and second data before and after the maintenance of first supply reel 50. When the first difference is determined to be smaller than a predetermined value, facility state diagnosis model generation section 124 does not use the first data and second data read before the maintenance of first supply reel 50 for generation or update of the learned model. On the other hand, when the first difference is determined to be greater than the predetermined value, the learned model (facility state diagnosis model M) is generated or updated using the first data and second data read before the maintenance of first supply reel 50.

On the other hand, facility state diagnosis model generation section 124 calculates the third probability of improvement of the defect of roll member 204, which is obtained by inputting the first data and second data before the maintenance of first bonding roll 205A, to the learned model. In addition, facility state diagnosis model generation section 124 calculates the fourth probability of improvement of the defect of roll member 204, which is obtained by inputting the first data and second data after the maintenance of first bonding roll 205A, to the learned model. Then, facility state diagnosis model generation section 124 calculates the second difference between third probability and the fourth probability. When the second difference is determined to be smaller than a predetermined value, the first data and second data read before the maintenance of first bonding roll 205A are not used for the creation or update of the learned model. On the other hand, when the second difference is determined to be equal to or greater than the predetermined value, the learned model is created or updated using the first data and second data before the maintenance of first bonding roll 205A.

As described above, maintenance display apparatus 100 according to Embodiment 1 can execute the learning process of generating, through learning, facility state diagnosis model M for diagnose of the facility state of production apparatus 200, the identification process of identifying whether there is an abnormality or a sign of an abnormality in production apparatus 200 by using facility state diagnosis model M, and making a notification when there is an abnormality or a sign of an abnormality, and the update process of updating facility state diagnosis model M on the basis of maintenance history data MD corresponding to the maintenance operation performed based on the notification.

More specifically, in the learning process, maintenance display apparatus 100 determines whether the maintenance operation has an effect on the basis of newly registered maintenance history data MD and the shape data included in history data PD of produced roll member 204 produced before and after the maintenance operation, and generates facility state diagnosis model M using the shape data and maintenance history data MD corresponding to the maintenance operation determined to be effective.

In addition, in the identification process, maintenance display apparatus 100 calculates match rate C between facility state diagnosis model M and the shape data of roll member 204 produced after the maintenance operation for each maintenance group, and determines whether to perform issue of an alarm and notification of the details of the maintenance operation, or only notification of the details of the maintenance operation, or, no notification itself, on the basis of match rate C.

In addition, in the update process, maintenance display apparatus 100 determines whether the maintenance operation has an effect on the basis of newly registered maintenance history data MD and the shape data included in history data PD of produced roll member 204 produced before and after the maintenance operation, generates new facility state diagnosis model $M_{new}$ by using the shape data and maintenance history data MD corresponding to the maintenance operation determined to be effective, and updates facility state diagnosis model M by using new facility state diagnosis model $M_{new}$.

With this configuration, the state of production apparatus 200 can be appropriately diagnosed using the learned model (facility state diagnosis model M) generated based on an effective maintenance operation (which has reduced the defect rate) among the actually performed maintenance operations. In addition, since the learned model is updated at any time, the accuracy of the diagnosis can be improved. Further, when it is diagnosed that an abnormality has occurred in production apparatus 200, it is possible to urge the user to make an urgent response by issuing an alarm; whereas when it diagnoses that there is a sign of an abnormality, the details of the maintenance operation that are expected to make an improvement are reported to the user. Thus, the maintenance operation can be executed while the rate of defective products is low in production apparatus 200.

The maintenance display apparatus according to the present embodiment includes the notification section, the maintenance effect determination section, and the facility state diagnosis model generation section. For each maintenance operation performed in the past, the notification section makes a notification of the details of the maintenance operation on the basis of the facility state diagnosis model in which the details of the maintenance operation and the production history data before the maintenance operation are associated with each other and registered in the database, and newly input production history data. The maintenance effect determination section determines whether the maintenance operation has an effect on the basis of the production history data before the time point when the maintenance operation is performed, and the production history data after the time point when the maintenance operation is performed. The facility state diagnosis model generation section generates a new facility state diagnosis model on the basis of the production history data before the time point when the maintenance operation determined to be effective is performed, and the details of the maintenance operation determined to be effective.

The maintenance display apparatus according to the present embodiment further includes the facility state diagnosis section that generates a facility state diagnosis index, which is the degree of match between newly registered production history data and the production history data before the maintenance operation included in the facility state diagnosis model. The notification section makes a notification of the details of the maintenance operation on the basis of the facility state diagnosis index.

In the maintenance display apparatus according to the present embodiment, the facility state diagnosis model generation section generates a facility state diagnosis model through machine learning by using the production history data before the time point when the maintenance operation determined to be effective is performed, and maintenance history data related to the maintenance operation.

When a maintenance operation that is not based on the details of the maintenance operation notified by the notification section is executed, and maintenance history data related to that maintenance operation is newly input, the maintenance display apparatus according to the present embodiment calculates the defect rate of defective inspection results in the production history data of the period of a predetermined time after the time point when the maintenance operation of the newly input maintenance history data is performed on the basis of data related to an inspection result of a product of the production facility included in the production history data. Further, it calculates the defect rate of defective inspection results in the production history data in the period of a predetermined time after the time point when the maintenance operation of the newly input maintenance history data is performed. Then, the maintenance effect determination section calculates the difference between the defect rate before the maintenance operation and the defect rate after the maintenance operation, and determines whether the maintenance operation has an effect on the basis of the value of the difference.

Embodiment 2

Figure 20:
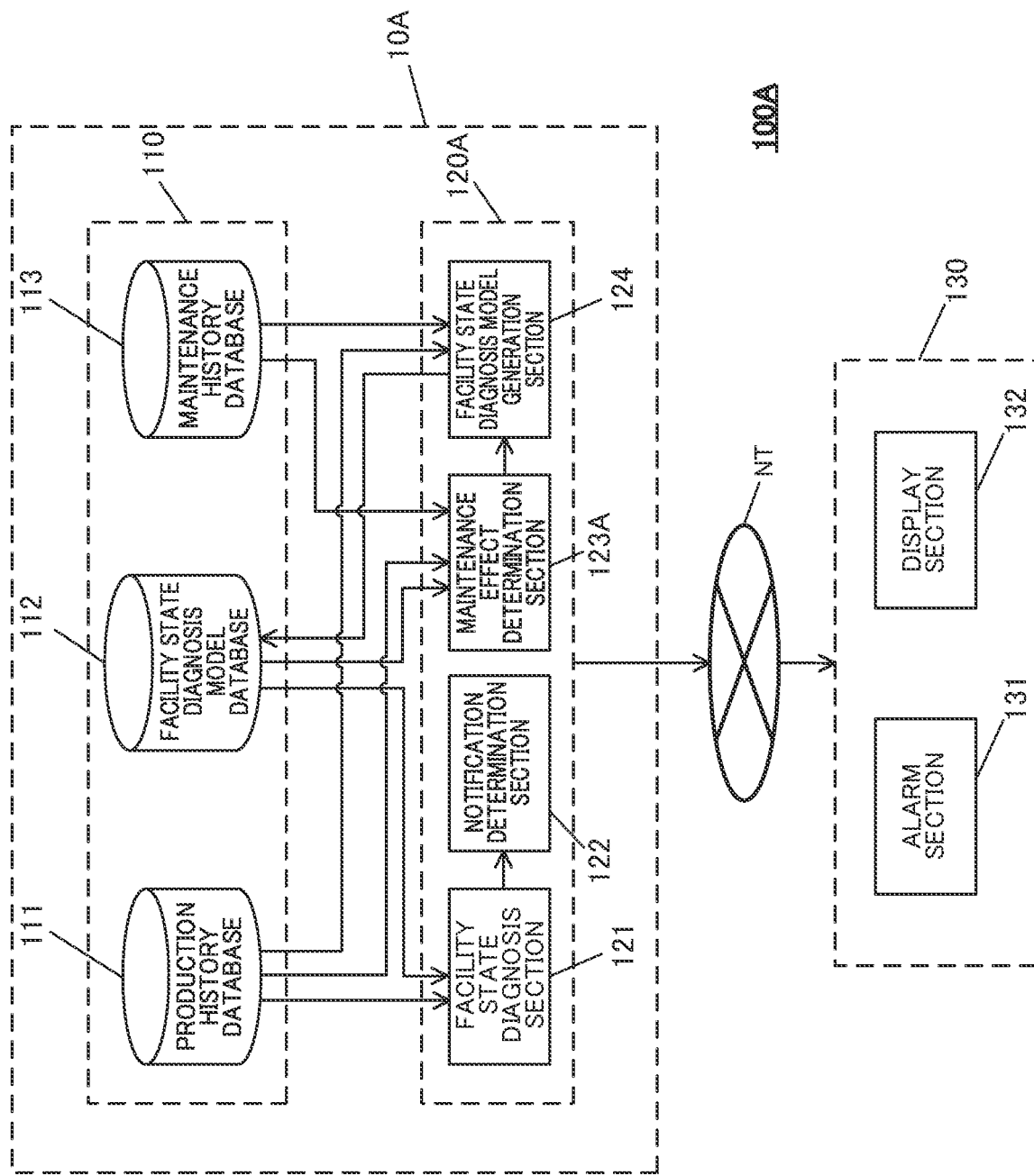
FIG. 20 is a diagram illustrating an example of a configuration of a maintenance display apparatus according to Embodiment 2.

Now Embodiment 2 of the present invention is described below. FIG. 20 is a diagram illustrating an example of a configuration of maintenance display apparatus 100A according to Embodiment 2. In maintenance display apparatus 100A according to Embodiment 2, the process performed by maintenance effect determination section 123A of control section 120A of server 10A is different from that of the above-described maintenance effect determination section 123 according to Embodiment 1.

Differences from Embodiment 1 are described below. The same components as those of Embodiment 1 are denoted with the same reference numerals of Embodiment 1, and the configurations different from those of Embodiment 1 are denoted with reference numerals with "A" attached thereto.

In Embodiment 1, a situation where the user of maintenance display apparatus 100 performs maintenance operations other than the details notified by maintenance display apparatus 100 is not taken into consideration. However, in the actual operation of production apparatus 200, required maintenance operations (maintenance operations other than the details of the maintenance notified by maintenance display apparatus 100) can be performed as necessary at any time based on on-site determination and the like. Embodiment 2 describes maintenance display apparatus 100A that can handle such a situation where maintenance operations other than the details of the maintenance notified by maintenance display apparatus 100A are performed.

Figure 21:
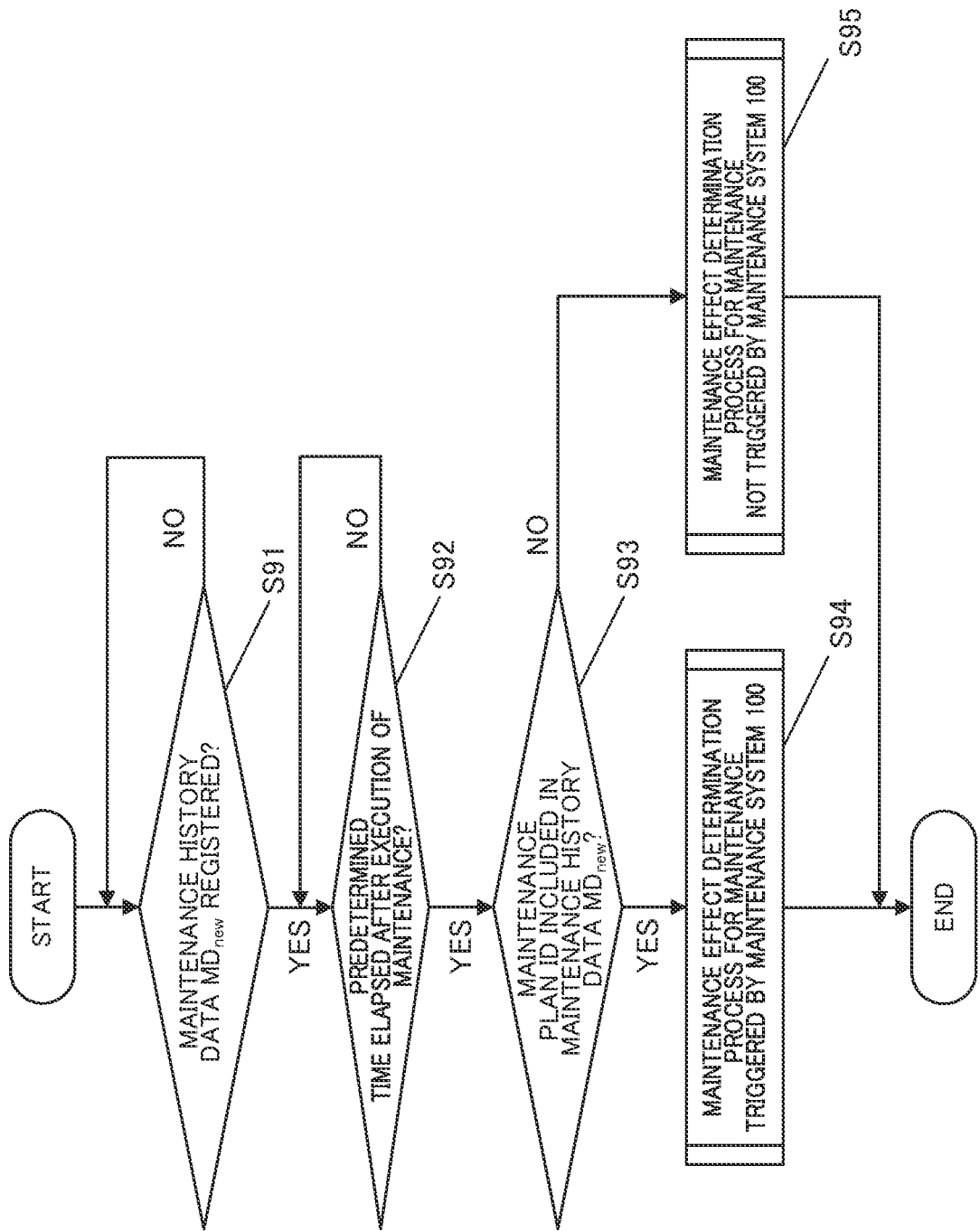
FIG. 21 is a flowchart for describing processes executed by a maintenance effect determination section in Embodiment 2.

FIG. 21 is a flowchart of processes executed by maintenance effect determination section 123A in Embodiment 2.

At step S91 in FIG. 21, maintenance effect determination section 123A determines whether new maintenance history data $MD_{new}$ is registered in maintenance history database 113 of storage section 110. When it is determined that new maintenance history data $MD_{new}$ is not registered (step S91: No), maintenance effect determination section 123A repeats step S91. When it is determined that new maintenance history data $MD_{new}$ is registered (step S91: YES), maintenance effect determination section 123A proceeds the process to step S92.

At step S92, maintenance effect determination section 123A determines whether a predetermined time has elapsed after the maintenance operation corresponding to newly registered maintenance history data $MD_{new}$ on the basis of the maintenance date and time data included in newly registered maintenance history data $MD_{new}$. The predetermined time is, for example, a time required for manufacturing roll members 204 of a certain number or more in the production apparatus 200 concerned after the maintenance operation is performed, as with the predetermined time described in Embodiment 1.

When it is determined that the predetermined time has elapsed after the maintenance operation (step S92: YES), maintenance effect determination section 123A proceeds the process to step S93. When it is determined that the predetermined time has not elapsed after the maintenance operation (step S92: No), maintenance effect determination section 123A repeats the process of step S92.

At step S93, maintenance effect determination section 123A determines whether there is maintenance plan ID associated with newly registered maintenance history data $MD_{new}$. As described in Embodiment 1, notification determination section 122 makes a notification of maintenance plan ID associated with the maintenance group of the details of the maintenance, together with the details of the maintenance operation. In this manner, when the operator who has performed the maintenance operation inputs maintenance history data MD, maintenance history data MD and maintenance plan ID that has triggered the maintenance are associated with each other. In this manner, at this step S93, whether newly registered maintenance history data $MD_{new}$ is a maintenance triggered by the notification of maintenance display apparatus 100A is determined.

At step S93, when there is maintenance plan ID associated with newly registered maintenance history data $MD_{new}$, it is determined that the maintenance operation corresponding to that maintenance history data $MD_{new}$ is triggered by the notification of the details of the maintenance of maintenance display apparatus 100A. In addition, when there is no maintenance plan ID associated with newly registered maintenance history data $MD_{new}$, it is determined that the maintenance operation corresponding to that maintenance history data $MD_{new}$ is not triggered by the notification of the details of the maintenance of maintenance display apparatus 100A.

At step S93, when it is determined that maintenance plan ID is included in newly registered maintenance history data $MD_{new}$ (step S93: YES), maintenance effect determination section 123A proceeds the process to step S94. On the other hand, when it is determined that maintenance plan ID is not included in maintenance history data $MD_{new}$ (step S93: No), maintenance effect determination section 123A proceeds the process to step S95.

Step S94 is a process of a case where the maintenance operation corresponding to newly registered maintenance history data $MD_{new}$ is triggered by the notification of the details of the maintenance of maintenance display apparatus 100A. Therefore, at step S94, maintenance effect determination section 123A proceeds to the process of determining whether the maintenance operation triggered by the notification of the details of the maintenance of maintenance display apparatus 100A has an effect. Note that the maintenance effect determination process for the maintenance triggered by the notification of the details of the maintenance of maintenance display apparatus 100A is substantially the same as the process described with reference to FIG. 17 in Embodiment 1, and therefore the description thereof is omitted.

On the other hand, step S95 is a process of a case where the maintenance operation corresponding to maintenance history data $MD_{new}$ is not triggered by the notification of the details of the maintenance of maintenance display apparatus 100A. In view of this, maintenance effect determination section 123A proceeds to the process of determining whether the maintenance operation that is not triggered by maintenance display apparatus 100A has an effect. Note that the maintenance effect determination process for the maintenance triggered by the notification of the details of the maintenance of maintenance display apparatus 100A is substantially the same as the process described with reference to FIG. 11 in Embodiment 1, and therefore the description thereof is omitted.

As described above, maintenance display apparatus 100A according to Embodiment 2 can favorably register maintenance history data $MD_{new}$ even in the case where a maintenance operation that is not triggered by the notification of the details of the maintenance of maintenance display apparatus 100A is performed. Note that the process of maintenance effect determination section 123A described in FIG. 21 may be executed in any of the learning process and the update process describe above.

The maintenance display apparatus according to the present embodiment generates the facility state diagnosis index before the maintenance operation on the basis of the production history data in the period of the predetermined time after the time point when the maintenance operation of newly registered maintenance history data is performed, and facility state diagnosis model associated with the details of the maintenance operation in the notification that has triggered the maintenance operation of the newly input maintenance history data. Then, the facility state diagnosis index after the maintenance operation is generated on the basis of the production history data in the period of the predetermined time after the time point when the maintenance operation of the newly input maintenance history data is performed, and the facility state diagnosis model associated with the details of the maintenance operation in the notification that has triggered the maintenance operation of newly input maintenance history data. Then, the maintenance effect determination section calculates the difference between the facility state diagnosis index before the maintenance operation and the facility state diagnosis index after the maintenance operation, and determines whether the maintenance operation has an effect on the basis of the value of the difference.

Embodiment 3

Figure 22:
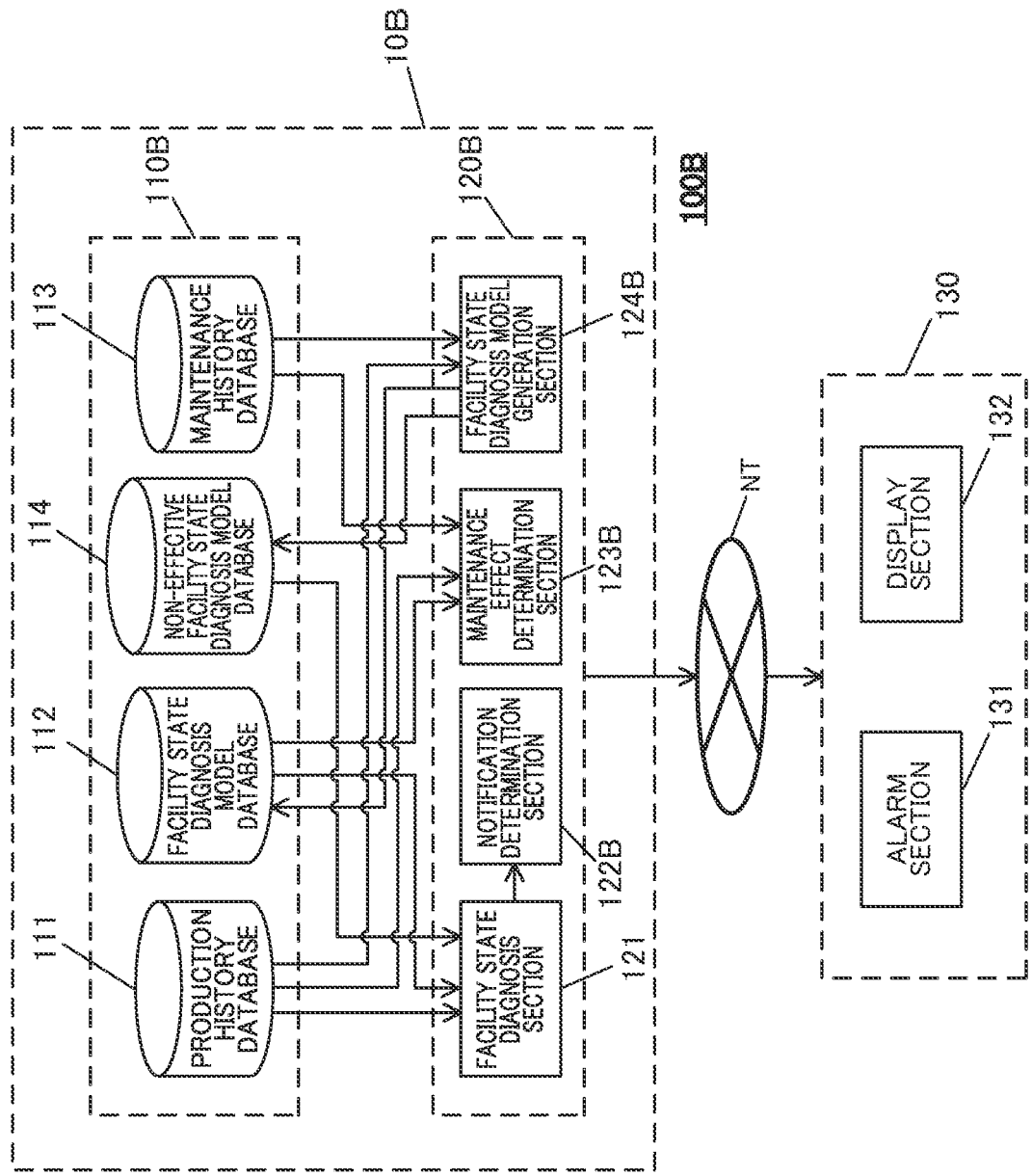
FIG. 22 is a diagram illustrating an example of a configuration of a maintenance display apparatus according to Embodiment 3.

Now Embodiment 3 of the present invention is described below. FIG. 22 is a diagram illustrating an example of a configuration of maintenance display apparatus 100B according to Embodiment 3. Maintenance display apparatus 100B according to Embodiment 3 is different from maintenance display apparatus 100 according to Embodiment 1 in that storage section 110B of server 10B further includes non-effective facility state diagnosis model database 114, and that control section 120B includes notification determination section 122B, maintenance effect determination section 123B, and facility state diagnosis model generation section 124B.

In the above-described in Embodiment 1, facility state diagnosis model generation section 124 generates new facility state diagnosis model $M_{new}$ by using maintenance history data MD determined to be effective (see FIG. 13). In Embodiment 3, facility state diagnosis model generation section 124B generates new facility state diagnosis model $M_{new}$ using also maintenance history data MD determined to be not effective in maintenance.

Figure 23:
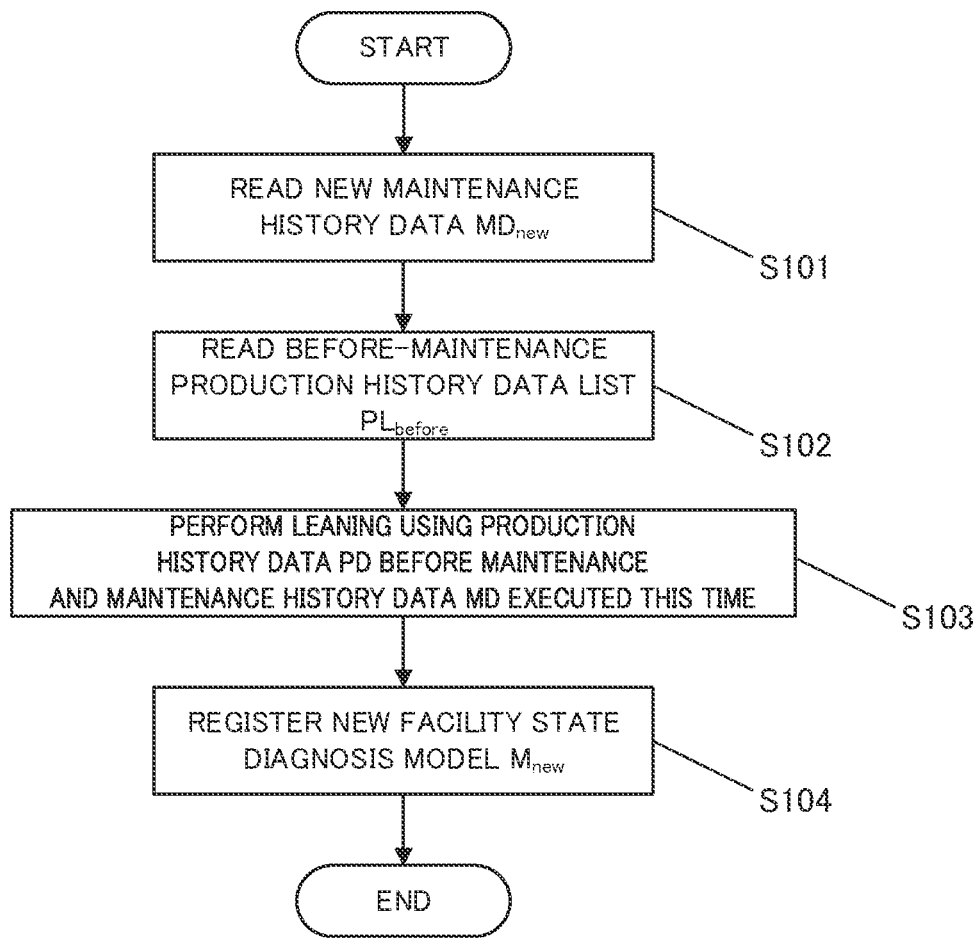
FIG. 23 is a flowchart for describing processes performed by a facility state diagnosis model generation section in Embodiment 3.

FIG. 23 is a flowchart of processes performed by facility state diagnosis model generation section 124B in Embodiment 3. Note that the processes described in FIG. 23 are executed in each of the learning process and the update process.

At step S101, facility state diagnosis model generation section 124B reads newly registered maintenance history data $MD_{new}$ from maintenance history database 113. Here, facility state diagnosis model generation section 124B reads maintenance history data $MD_{new}$ regardless of the result of determination of the effect at maintenance effect determination section 123B.

At step S102, facility state diagnosis model generation section 124B reads production history data list $PL_{before}$ before the maintenance operation from production history database 111.

At step S103, facility state diagnosis model generation section 124B generates facility state diagnosis model $M_{new}$ by using the read maintenance history data $MD_{new}$ and production history data PD included in production history data list $PL_{before}$.

At step S104, facility state diagnosis model generation section 124B registers, in non-effective facility state diagnosis model database 114, the model generated based on maintenance history data MD determined to be not effective among newly generated facility state diagnosis model $M_{new}$. On the other hand, facility state diagnosis model generation section 124B registers, in facility state diagnosis model database 112, the model generated based on maintenance history data MD determined to be effective among newly generated facility state diagnosis model $M_{new}$.

In this manner, facility state diagnosis model generation section 124B not only generates facility state diagnosis model M using maintenance history data MD determined to be effective maintenance, but also generates facility state diagnosis model M using maintenance history data MD of the maintenance determined to be not effective.

The identification process at facility state diagnosis section 121 and notification determination section 122B is executed by using facility state diagnosis model M generated in the above-described manner. The processes executed by facility state diagnosis section 121 are substantially the same as the processes described with reference to FIG. 14 in Embodiment 1, and therefore the description thereof is omitted.

Figure 24:
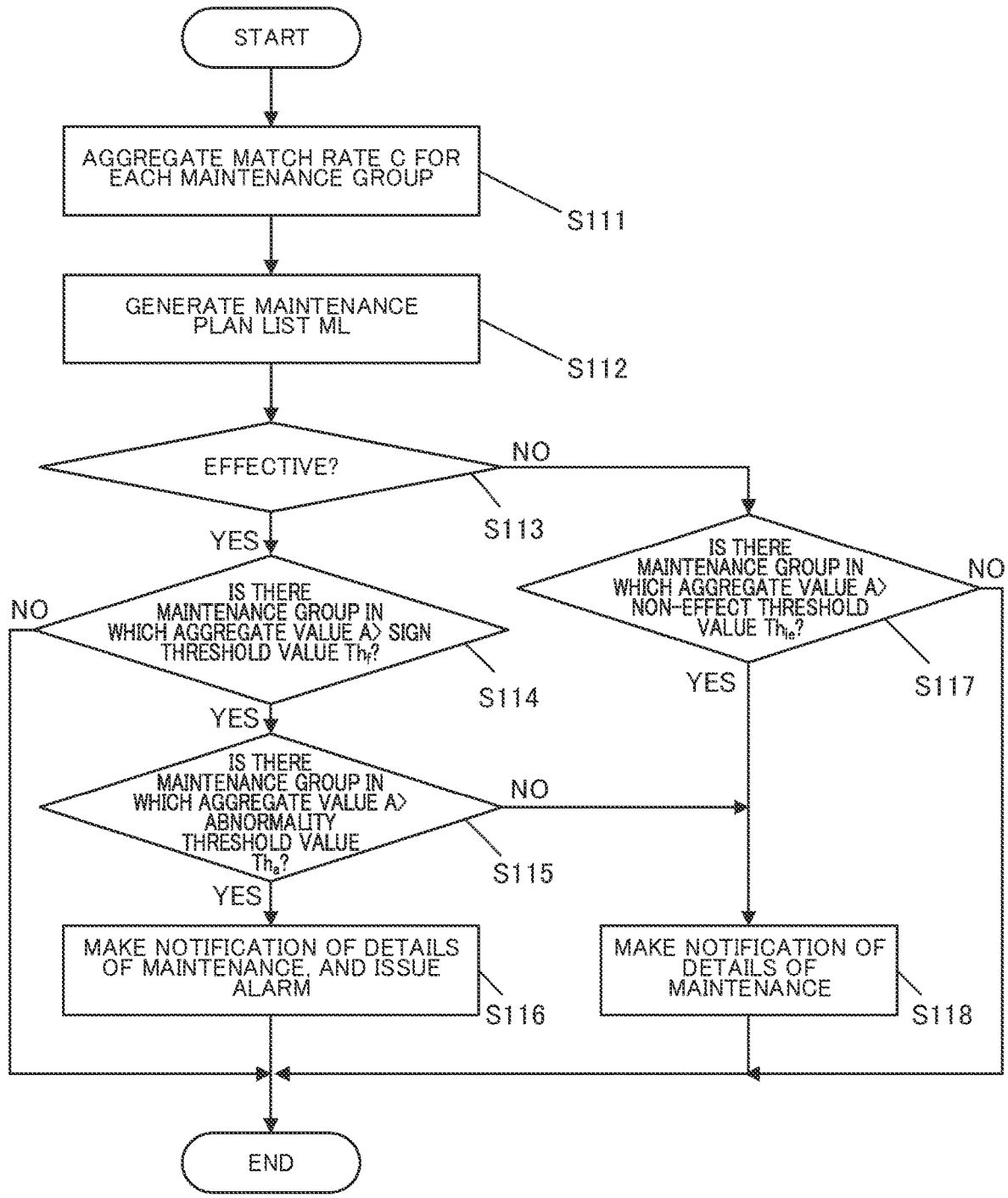
FIG. 24 is a flowchart for describing processes performed by a notification determination section in Embodiment 3.

Processes executed by notification determination section 122B in the identification process of Embodiment 3 are described below. FIG. 24 is a flowchart of processes performed by notification determination section 122B in Embodiment 3.

At step S111, notification determination section 122B generates aggregate value A by aggregating match rate C for each maintenance group by using match rate C generated by facility state diagnosis section 121. Note that in Embodiment 3, information (flag) representing whether it is a maintenance operation determined to be effective is associated with each maintenance group by maintenance effect determination section 123B.

At step S112, notification determination section 122B generates maintenance plan list ML, which is a list of the maintenance group arranged in descending order of aggregate value A.

At step S113, notification determination section 122B determines whether it is determined to be effective for each maintenance group included in maintenance plan list ML. As described above, in Embodiment 3, a flag indicating whether it is effective is associated for each maintenance group by facility state diagnosis section 121, and therefore notification determination section 122B performs the process of the step S113 with reference to the flag. For the maintenance group of the maintenance operation determined to be effective, notification determination section 122B proceeds the process to step S114. On the other hand, for the maintenance group of the maintenance operation determined to be not effective, notification determination section 122B proceeds the process to step S117.

At step S114, notification determination section 122B determines whether aggregate value A is greater than predetermined sign threshold value $Th_f$ for each maintenance group determined to be effective. When there is at least one the maintenance group in which aggregate value A is greater than sign threshold value $Th_f$ (step S114: YES), notification determination section 122B proceeds the process to step S115. When there is no maintenance group in which aggregate value A is greater than sign threshold value $Th_f$ (step S115: No), notification determination section 122B terminates the process.

At step S115, notification determination section 122B determines whether there is a maintenance group in which aggregate value A is greater than predetermined abnormality threshold value $Th_a$ among the maintenance groups determined to be effective. When there is a maintenance group in which aggregate value A is greater than abnormality threshold value $Th_a$ (step S115: YES), notification determination section 122B proceeds the process to step S116. When there is no maintenance group in which aggregate value A is greater than abnormality threshold value $Th_a$ (step S115: No), notification determination section 122B proceeds the process to step S118.

At step S116, notification determination section 122B makes a notification of the details of the maintenance corresponding to the maintenance group in which aggregate value A is greater than sign threshold value $Th_f$ determined at step S114, and issues an alarm for making a notification that object production apparatus 200 has an abnormality.

At step S117, notification determination section 122B determines whether aggregate value A is greater than predetermined non-effect threshold value $Th_{ie}$ for each maintenance group of the maintenance determined to be not effective. Non-effect threshold value $Th_{ie}$ is a minimum aggregate value at which a notification of non-effectiveness should be made. When there is a maintenance group in which aggregate value A is greater than non-effect threshold value $Th_{ie}$ (step S117: YES), notification determination section 122B proceeds the process to step S118. When there is no maintenance group in which aggregate value A is greater than non-effect threshold value $Th_{ie}$ (step S117: No), notification determination section 122B terminates the process.

At step S118, notification determination section 122B makes a notification of the details of the maintenance corresponding to the maintenance group in which aggregate value A is greater than sign threshold value $Th_f$ determined at step S114. Simultaneously, notification determination section 122B makes a notification of the details of the maintenance corresponding to the maintenance group in which aggregate value A is greater than non-effect threshold value $Th_{ie}$ determined at step S117.

With this configuration, maintenance display apparatus 100B according to Embodiment 3 can notify the user not only of the details of the maintenance that are expected to improve production apparatus 200, but also of the details of the maintenance operation that has been not effective in the past implementation. In this manner, the user can avoid a situation where an ineffective maintenance operation is repeated, and thus the time required for the maintenance can be shortened, and, the task required for the maintenance can be reduced.

In the maintenance display apparatus according to the present embodiment, the facility state diagnosis model generation section generates a new facility state diagnosis model on the basis of the production history data before the time point when the maintenance operation determined to be not effective is performed, and the maintenance history data related to that maintenance operation. The notification section makes a notification of the details of the maintenance operation determined to be effective as an effective maintenance operation, and makes a notification of the details of the maintenance operation associated with the facility state diagnosis model generated based on the maintenance history data related to the maintenance operation determined to be not effective, as an ineffective maintenance operation.

Modification

While the embodiments of the present disclosure have been described above with reference to the drawings, the present disclosure is not limited to the above-described examples. It is obvious that a person skilled in the art can conceive of various examples of changes or modifications within the scope of the claims, which are also naturally understood to belong to the technical scope of the present disclosure. In addition, the components in the above embodiments may be combined as desired without departing from the purpose of the disclosure.

In the above-described embodiment, in the process of determining whether the maintenance operation has an effect at maintenance effect determination section 123 in the learning process, the effectiveness is determined based on whether the difference of the defect rate between before and after the maintenance operation is greater than the predetermined threshold value (see FIG. 12A and FIG. 12B).

Figure 25A:
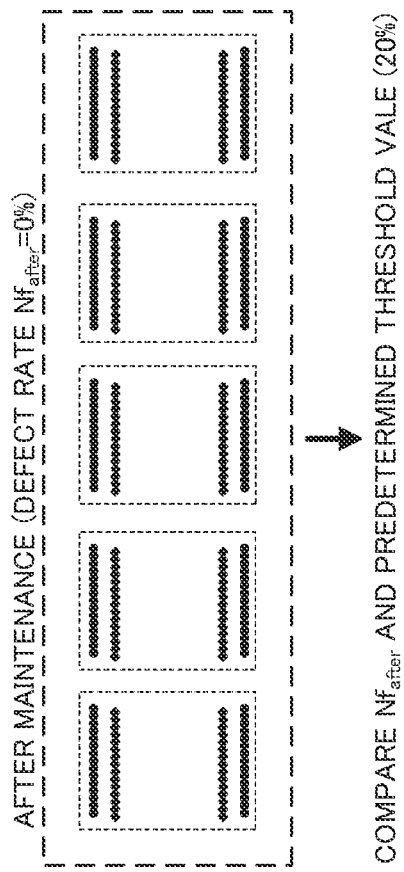
FIG. 25A is a diagram for describing a modification of the method of determining whether the maintenance operation has an effect at a maintenance effect determination section in a learning process.
Figure 25B:
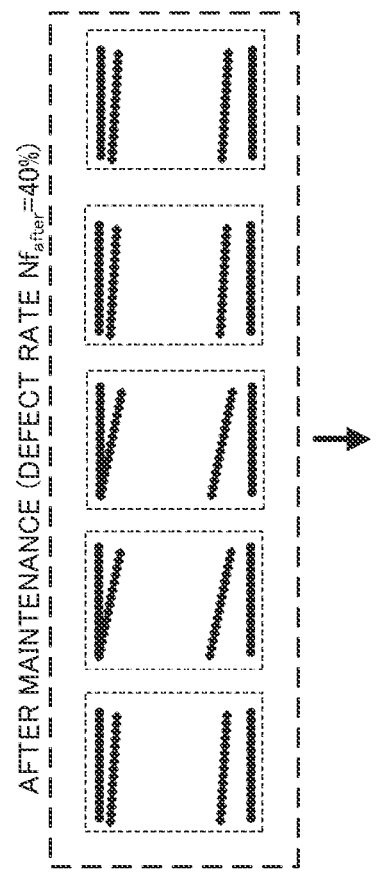
FIG. 25B is a diagram for describing a modification of the method of determining whether the maintenance operation has an effect at a maintenance effect determination section in a learning process.

However, maintenance effect determination section 123 may use other methods to determine whether the maintenance operation has an effect. FIG. 25A and FIG. 25B are diagrams for describing a modification of the method of determining whether the maintenance operation has an effect by maintenance effect determination section 123 in the learning process.

In the example illustrated in FIG. 25A and FIG. 25B, the effectiveness is determined based on whether after-maintenance defect rate $Nf_{after}$ is greater than a predetermined threshold value (for example 20%) without referring to the before-maintenance defect rate. In the example illustrated in FIG. 25A, $Nf_{after}$=0%, which is smaller than the predetermined threshold value 20%, holds, and therefore it is determined to be effective. On the other hand, in the example illustrated in FIG. 25B, $Nf_{after}$=40%, which is greater than the predetermined threshold value 20%, holds, and therefore it is determined to be not effective.

Likewise, also in the update process, maintenance effect determination section 123 may use a method different from that of the above-described embodiment to determine whether the maintenance operation has an effect.

In addition, in the embodiment, in the process of determining whether the maintenance operation has an effect at maintenance effect determination section 123 in the update process, the effectiveness is determined based on whether the difference of the match rate between before and after the maintenance operation is greater than the predetermined threshold value (see FIG. 18A and FIG. 18B).

FIG. 26A and FIG. 26B are diagrams for describing a modification of the method of determining whether the maintenance operation has an effect by maintenance effect determination section 123 in the update process.

In the example illustrated in FIG. 26A and FIG. 26B, the effectiveness is determined based on whether after-maintenance match rate $C_{after}$ is greater than a predetermined threshold value (for example 0.30) without referring to the before-maintenance match rate. In the example illustrated in FIG. 26A, $C_{after}$=0.20, which is smaller than the predetermined threshold value 0.30, holds, and therefore it is determined to be effective. On the other hand, in the example illustrated in FIG. 26B, $Cf_{after}$=0.90, which is greater than the predetermined threshold value 0.30, holds, and therefore it is determined to be not effective.

In the embodiment, maintenance display apparatus 100 (100A, 100B) includes storage section 110 (110B), control section 120 (120A, 120B), and notification section 130 for the sake of description, but the present invention is not limited to this configuration. As described in the embodiments, in the present invention, as long as the storage section and the control section are communicable, they may be configured as separate members disposed at positions separated from each other. In addition, the notification section may be included in the production apparatus, or may be installed outside the production apparatus. In addition, the notification section may be connected to the storage section and the control section through the network or directly.

In this manner, in the maintenance display apparatus according to the embodiment of the present invention, the storage section, the control section, and the notification section may be independent separate devices that operate independently of each other. In addition, as long as the storage section, the control section, and the notification section can communicate with each other, their installation positions are not limited. The notification device may be configured to be disposed in a factory or the like where the production apparatus is disposed, and the storage section and the control section may be configured to be included in a cloud server provided on the cloud, for example.

In addition, in the embodiment, control section 120 (120A, 120B) performs all of the learning process, the update process, and the identification process. Further, in the identification process, control section 120 (120A, 120B) performs the notification process by controlling notification section 130. Note that the learning process is a process of generating facility state diagnosis model M, and the update process is a process of updating facility state diagnosis model M. In addition, the identification process is a process of determining whether an abnormality or a sign of an abnormality is caused in a plurality of newly produced roll members 204 by using facility state diagnosis model M. However, the present invention is not limited to this.

For example, the control section may perform only the learning process or the update process, such that the notification section receives the facility state diagnosis model from the control section and the identification process is performed using the received facility state diagnosis model. With this configuration, the increase of the communication amount between the control section and the notification section can be suppressed. Further, even in the case where a plurality of notification sections is connected to the control section, the load of the identification process can be dispersed to the notification sections, and thus the delay of processes due to concentration of the process at the control section can be prevented.

A method of generating a learned model according to an embodiment of the present disclosure is a method of generating a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the method comprising: acquiring, from the sensor, first data representing a position of the first end surface read along the radial direction and second data representing a position of the second end surface read along the radial direction; generating a learned model for determining that a cause of a defect of the roll member is the first supply reel or the first bonding roller when it is determined that a sequence of the position of the first end surface represented by the first data intersects a sequence of the position of the second end surface represented by the second data on a basis of the first data and the second data; outputting information indicating that the cause of the defect is the first supply reel or the first bonding roller to a display apparatus for maintenance on a basis of a determination using the learned model; and updating the learned model such that when it is determined that a fifth probability that the defect of the roll member is improved is equal to or greater than a predetermined value, the first data and the second data read before the maintenance of the first supply reel are not used for the updating of the learned model, whereas when it is determined that the fifth probability is smaller than the predetermined value, the first data and the second data before the maintenance of the first supply reel are used for the updating of the learned model, the fifth probability being obtained by inputting the first data and the second data after the maintenance of the first supply reel to the learned model.

In the method of generating a learned model according to an embodiment of the present disclosure, the learned model is updated such that when it is determined that a sixth probability that the defect of the roll member is improved is equal to or greater than a predetermined value, the first data and the second data read before the maintenance of the first bonding roller are not used for the updating of the learned model, whereas when it is determined that the sixth probability is equal to or greater than the predetermined value, the first data and the second data before the maintenance of the first bonding roller are used for the updating of the learned model, the sixth probability being obtained by inputting the first data and the second data after the maintenance of the first bonding roller to the learned model.

In the method of generating a learned model according to an embodiment of the present disclosure, the first electrode sheet is a positive electrode sheet of a battery, and the second electrode sheet is a negative electrode sheet of the battery.

In the method of generating a learned model according to an embodiment of the present disclosure, the first electrode sheet is a negative electrode sheet of a battery, and the second electrode sheet is a positive electrode sheet of the battery.

A maintenance display apparatus of an embodiment of the present disclosure is configured to display information about maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the maintenance display apparatus comprising: a notification determination section configured to acquire, from the sensor, first data representing a position of the first end surface read along the radial direction and second data representing a position of the second end surface read along the radial direction, determine whether the roll member has a defect on a basis of whether a sequence of the position of the first end surface represented by the first data intersects a sequence of the position of the second end surface represented by the second data on a basis of the first data and the second data, and output information indicating that a cause of the defect is the first supply reel or the first bonding roller to a display apparatus for maintenance when the roll member has the defect; and a model generation section configured to generate a learned model such that on a basis of the first data and the second data before and after maintenance of the first supply reel, when it is determined that a first difference between a first defect rate of the roll member before the maintenance of the first supply reel and a second defect rate of the roll member after the maintenance of the first supply reel is smaller than a predetermined value, the first data and the second data read before the maintenance of the first supply reel are not used to generate the learned model, whereas when it is determined that the first difference is equal to or greater than the predetermined value, the first data and the second data read before the maintenance of the first supply reel are used to generate the learned model.

A maintenance display apparatus of an embodiment of the present disclosure is configured to display information about maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the maintenance display apparatus comprising: a notification determination section configured to acquire, from the sensor, first data representing a position of the first end surface read along the radial direction and second data representing a position of the second end surface read along the radial direction, determine whether the roll member has a defect on a basis of whether a sequence of the position of the first end surface represented by the first data intersects a sequence of the position of the second end surface represented by the second data on a basis of the first data and the second data, and output information indicating that a cause of the defect is the first supply reel or the first bonding roller to a display apparatus for maintenance when the roll member has the defect; and a model generation section configured to generate a learned model such that on a basis of the first data and the second data after maintenance of the first supply reel, when it is determined that a fifth defect rate of the roll member after the maintenance of the first supply reel is equal to or greater than a predetermined value, the first data and the second data read before the maintenance of the first supply reel are not used to generate the learned model, whereas when it is determined that the fifth defect rate is smaller than the predetermined value, the first data and the second data read before the maintenance of the first supply reel are used to generate the learned model.

A maintenance display apparatus of an embodiment of the present disclosure is configured to display information about maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the maintenance display apparatus comprising: a model generation section configured to acquire, from the sensor, first data representing a position of the first end surface read along the radial direction and second data representing a position of the second end surface read along the radial direction, determine whether the roll member has a defect on a basis of whether a sequence of the position of the first end surface represented by the first data intersects a sequence of the position of the second end surface represented by the second data on a basis of the first data and the second data, and generate a learned model for determining that a cause of the defect is the first supply reel or the first bonding roller when the roll member has the defect; and a notification determination section configured to identify that the cause of the defect is the first supply reel or the first bonding roller by using the learned model, and output information including an identification result to a display apparatus for maintenance, wherein the model generation section updates the learned model such that when it is determined that a first difference between a first probability that the defect of the roll member is improved and a second probability that the defect of the roll member is improved is smaller than a predetermined value, the first data and the second data read before maintenance of the first supply reel are not used to update the learned model, whereas when it is determined that the first difference is equal to or greater than the predetermined value, the first data and the second data before the maintenance of the first supply reel are used to update the learned model, the first probability being obtained by inputting the first data and the second data before the maintenance of the first supply reel to the learned model, the second probability being obtained by inputting by the first data and the second data after the maintenance of the first supply reel to the learned model.

A maintenance display apparatus of an embodiment of the present disclosure is configured to display information about maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the maintenance display apparatus comprising: a model generation section configured to acquire, from the sensor, first data representing a position of the first end surface read along the radial direction and second data representing a position of the second end surface read along the radial direction, determine whether the roll member has a defect on a basis of whether a sequence of the position of the first end surface represented by the first data intersects a sequence of the position of the second end surface represented by the second data on a basis of the first data and the second data, and generate a learned model for determining that a cause of the defect is the first supply reel or the first bonding roller when the roll member has the defect; and a notification determination section configured to identify that the cause of the defect is the first supply reel or the first bonding roller by using the learned model, and output information including an identification result to a display apparatus for maintenance, wherein the model generation section updates the learned model such that when it is determined that a fifth probability that the defect of the roll member is equal to or greater than a predetermined value, the first data and the second data read before maintenance of the first supply reel are not used to update the learned model, whereas when it is determined that the fifth probability is smaller than the predetermined value, the first data and the second data before the maintenance of the first supply reel are used to update the learned model, the fifth probability being obtained by inputting the first data and the second data after the maintenance of the first supply reel to the learned model.

A non-transitory computer readable medium of an embodiment of the present disclosure stores computer executable instructions, when executed by a computer configured to generate a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the instructions which cause the computer to perform a processing comprising: acquiring, from the sensor, first data representing a position of the first end surface read along the radial direction and second data representing a position of the second end surface read along the radial direction; outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and generating the learned model such that on a basis of the first data and the second data before and after maintenance of the first supply reel, when it is determined that a first difference between a first defect rate of the roll member before the maintenance of the first supply reel and a second defect rate of the roll member after the maintenance of the first supply reel is smaller than a predetermined value, the first data and the second data read before the maintenance of the first supply reel are not used for the generating of the learned model, whereas when it is determined that the first difference is equal to or greater than the predetermined value, the first data and the second data read before the maintenance of the first supply reel are used for the generating of the learned model.

A non-transitory computer readable medium of an embodiment of the present disclosure stores computer executable instructions, when executed by a computer configured to generate a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the instructions which cause the computer to perform a processing comprising: acquiring, from the sensor, first data representing a position of the first end surface read along the radial direction and second data representing a position of the second end surface read along the radial direction; outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and generating the learned model such that on a basis of the first data and the second data before and after maintenance of the first supply reel, when it is determined that a fifth defect rate of the roll member after the maintenance of the first supply reel is determined to be equal to or greater than a predetermined value, the first data and the second data read before the maintenance of the first supply reel are not used for the generating of the learned model, whereas when it is determined that the fifth defect rate is smaller than the predetermined value, the first data and the second data read before the maintenance of the first supply reel are used for the generating of the learned model.

A non-transitory computer readable medium of an embodiment of the present disclosure stores computer executable instructions, when executed by a computer configured to generate a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the instructions which cause the computer to perform a processing comprising: acquiring, from the sensor, first data representing a position of the first end surface read along the radial direction and second data representing a position of the second end surface read along the radial direction; generating a learned model for determining that a cause of a defect of the roll member is the first supply reel or the first bonding roller when it is determined that a sequence of the position of the first end surface represented by the first data intersects a sequence of the position of the second end surface represented by the second data on a basis of the first data and the second data; outputting information indicating that the cause of the defect is the first supply reel or the first bonding roller to a display apparatus for maintenance on a basis of a determination using the learned model; and updating the learned model such that when it is determined that a first difference between a first probability that the defect of the roll member is improved and a second probability that the defect of the roll member is improved is smaller than a predetermined value, the first data and the second data read before the maintenance of the first supply reel are not used for the updating of the learned model, whereas when it is determined that the first difference is equal to or greater than the predetermined value, the first data and the second data before the maintenance of the first supply reel are used for the updating of the learned model, the first probability being obtained by inputting the first data and the second data before the maintenance of the first supply reel to the learned model, the second probability being obtained by inputting by the first data and the second data after the maintenance of the first supply reel to the learned model.

A non-transitory computer readable medium of an embodiment of the present disclosure stores computer executable instructions, when executed by a computer configured to generate a learned model for maintenance of a production apparatus, the production apparatus including: a first supply reel configured to supply a first electrode sheet; a second supply reel configured to supply a second electrode sheet; a first bonding roller provided on a first electrode sheet side; a second bonding roller provided on a second electrode sheet side and paired with the first bonding roller, the second bonding roller being configured to bond the first electrode sheet and the second electrode sheet together; a winding core around which the first electrode sheet and the second electrode sheet bonded together are wound; and a sensor configured to read a first end surface of the first electrode sheet and a second end surface of the second electrode sheet along a radial direction of a roll member of the first electrode sheet and the second electrode sheet wound around the winding core, the instructions which cause the computer to perform a processing comprising: acquiring, from the sensor, first data representing a position of the first end surface read along the radial direction and second data representing a position of the second end surface read along the radial direction; generating a learned model for determining that a cause of a defect of the roll member is the first supply reel or the first bonding roller when it is determined that a sequence of the position of the first end surface represented by the first data intersects a sequence of the position of the second end surface represented by the second data on a basis of the first data and the second data; outputting information indicating that the cause of the defect is the first supply reel or the first bonding roller to a display apparatus for maintenance on a basis of a determination using the learned model; and updating the learned model such that when it is determined that a fifth probability that the defect of the roll member is equal to or greater than a predetermined value, the first data and the second data read before the maintenance of the first supply reel are not used for the updating of the learned model, whereas when it is determined that the fifth probability is smaller than the predetermined value, the first data and the second data before the maintenance of the first supply reel are used for the updating of the learned model, the fifth probability being obtained by inputting the first data and the second data after the maintenance of the first supply reel to the learned model.

INDUSTRIAL APPLICABILITY

The present disclosure is suitable for a maintenance display apparatus that displays information about the maintenance of production facilities.

REFERENCE SIGNS LIST 10, 10A, 10B Server
50 First supply reel
51 Second supply reel
100, 100A, 100B Maintenance display apparatus
110, 110B Storage section
111 Production history database
112 Facility state diagnosis model database
113 Maintenance history database
114 Non-effective facility state diagnosis model database
120, 120A, 120B Control section
121 Facility state diagnosis section
122, 122B Notification determination section
123, 123A, 123B Maintenance effect determination section
124, 124B Facility state diagnosis model generation section
130 Notification section
131 Alarm section
132 Display section
200 Production apparatus
201 Winding part
202 First sheet member
203 Second sheet member
204 Roll member
205A First bonding roll
205B Second bonding roll
206 Winding core
206M Winding core rotation drive part
207 Inspection machine

The invention claimed is:

1. A method of generating a learned model for maintenance of a production apparatus, the production apparatus including:
a first supply reel configured to supply a first electrode sheet;
a second supply reel configured to supply a second electrode sheet;
a first bonding roller provided on a first electrode sheet side;
a second bonding roller provided on a second electrode sheet side and paired with the first bonding roller, the second bonding roller being configured to bond the first electrode sheet and the second electrode sheet together;
a winding core for winding the bonded first and second electrode sheets thereon; and
a sensor configured to read a first end surface of the first electrode sheet and a second end surface of the second electrode sheet along a radial direction of a roll member of the first electrode sheet and the second electrode sheet wound around the winding core, the method comprising:
acquiring, from the sensor, first data representing a position of the first end surface read along the radial direction and second data representing a position of the second end surface read along the radial direction;
outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and
generating the learned model such that on a basis of the first data and the second data before and after maintenance of the first supply reel, when it is determined that a first difference between a first defect rate of the roll member before the maintenance of the first supply reel and a second defect rate of the roll member after the maintenance of the first supply reel is smaller than a predetermined value, the first data and the second data read before the maintenance of the first supply reel are not used for the generating of the learned model, whereas when it is determined that the first difference is equal to or greater than the predetermined value, the first data and the second data read before the maintenance of the first supply reel are used for the generating of the learned model.

2. The method according to claim 1, wherein on a basis of the first data and the second data before and after maintenance of the first bonding roller, when it is determined that a second difference between a third defect rate of the roll member before the maintenance of the first bonding roller and a fourth defect rate of the roll member before the maintenance of the first bonding roller is smaller than a predetermined value, the first data and the second data read before the maintenance of the first bonding roller are not used for the generating of the learned model, whereas when it is determined that the second difference is equal to or greater than the predetermined value, the first data and the second data read before the maintenance of the first bonding roller are used for the generating of the learned model.

3. The method according to claim 1, wherein the first electrode sheet is a positive electrode sheet of a battery, and the second electrode sheet is a negative electrode sheet of the battery.

4. The method according to claim 1, wherein the first electrode sheet is a negative electrode sheet of a battery, and the second electrode sheet is a positive electrode sheet of the battery.

5. A method of generating a learned model for maintenance of a production apparatus, the production apparatus including:
- a first supply reel configured to supply a first electrode sheet;
- a second supply reel configured to supply a second electrode sheet;
- a first bonding roller provided on a first electrode sheet side;
- a second bonding roller provided on a second electrode sheet side and paired with the first bonding roller, the second bonding roller being configured to bond the first electrode sheet and the second electrode sheet together;
- a winding core for winding the bonded first and second electrode sheets thereon; and
- a sensor configured to read a first end surface of the first electrode sheet and a second end surface of the second electrode sheet along a radial direction of a roll member of the first electrode sheet and the second electrode sheet wound around the winding core, the method comprising:
- acquiring, from the sensor, first data representing a position of the first end surface read along the radial direction and second data representing a position of the second end surface read along the radial direction;
- outputting information indicating that the roll member has a defect and that a cause of the defect is the first supply reel or the first bonding roller to a display apparatus for maintenance when it is determined that a sequence of the position of the first end surface represented by the first data intersects a sequence of the position of the second end surface represented by the second data on a basis of the first data and the second data; and
- generating the learned model such that on a basis of the first data and the second data before and after maintenance of the first supply reel, when it is determined that a fifth defect rate of the roll member after the maintenance of the first supply reel is determined to be equal to or greater than a predetermined value, the first data and the second data read before the maintenance of the first supply reel are not used for the generating of the learned model, whereas when it is determined that the fifth defect rate is smaller than the predetermined value, the first data and the second data read before the maintenance of the first supply reel are used for the generating of the learned model.

6. The method according to claim 5, wherein on a basis of the first data and the second data after maintenance of the first bonding roller, when it is determined that a sixth defect rate of the roll member after the maintenance of the first bonding roller is equal to or greater than a predetermined value, the first data and the second data read before the maintenance of the first bonding roller are not used for the generating of the learned model, whereas when it is determined that the sixth defect rate is smaller than the predetermined value, the first data and the second data read before the maintenance of the first bonding roller are used for the generating of the learned model.

7. The method according to claim 5, wherein the first electrode sheet is a positive electrode sheet of a battery, and the second electrode sheet is a negative electrode sheet of the battery.

8. The method according to claim 5, wherein the first electrode sheet is a negative electrode sheet of a battery, and the second electrode sheet is a positive electrode sheet of the battery.

9. A method of generating a learned model for maintenance of a production apparatus, the production apparatus including:
- a first supply reel configured to supply a first electrode sheet;
- a second supply reel configured to supply a second electrode sheet;
- a first bonding roller provided on a first electrode sheet side;
- a second bonding roller provided on a second electrode sheet side and paired with the first bonding roller, the second bonding roller being configured to bond the first electrode sheet and the second electrode sheet together;
- a winding core for winding the bonded first and second electrode sheets thereon; and
- a sensor configured to read a first end surface of the first electrode sheet and a second end surface of the second electrode sheet along a radial direction of a roll member of the first electrode sheet and the second electrode sheet wound around the winding core, the method comprising:
- acquiring, from the sensor, first data representing a position of the first end surface read along the radial direction and second data representing a position of the second end surface read along the radial direction;
- generating a learned model for determining that a cause of a defect of the roll member is the first supply reel or the first bonding roller when it is determined that a sequence of the position of the first end surface represented by the first data intersects a sequence of the position of the second end surface represented by the second data on a basis of the first data and the second data;
- outputting information indicating that the cause of the defect is the first supply reel or the first bonding roller to a display apparatus for maintenance on a basis of a determination using the learned model; and
- updating the learned model such that when it is determined that a first difference between a first probability that the defect of the roll member is improved and a second probability that the defect of the roll member is improved is smaller than a predetermined value, the first data and the second data read before the maintenance of the first supply reel are not used for the updating of the learned model, whereas when it is determined that the first difference is equal to or greater than the predetermined value, the first data and the second data before the maintenance of the first supply reel are used for the updating of the learned model, the first probability being obtained by inputting the first data and the second data before the maintenance of the first supply reel to the learned model, the second probability being obtained by inputting by the first data and the second data after the maintenance of the first supply reel to the learned model.

10. The method according to claim 9, wherein the learned model is updated such that when it is determined that a second difference between a third probability that the defect of the roll member is improved and a fourth probability that the defect of the roll member is improved is smaller than a predetermined value, the first data and the second data read before the maintenance of the first bonding roller are not used for the updating of the learned model, whereas when it is determined that the second difference is equal to or greater than the predetermined value, the first data and the second data before the maintenance of the first bonding roller are used for the updating of the learned model, the third probability being obtained by inputting the first data and the second data before the maintenance of the first bonding roller to the learned model, the fourth probability being obtained by inputting by the first data and the second data after the maintenance of the first bonding roller to the learned model.

11. The method according to claim 9, wherein the first electrode sheet is a positive electrode sheet of a battery, and the second electrode sheet is a negative electrode sheet of the battery.

12. The method according to claim 9, wherein the first electrode sheet is a negative electrode sheet of a battery, and the second electrode sheet is a positive electrode sheet of the battery.

\* \* \* \* \*